(12) United States Patent
Kumar et al.

(10) Patent No.: US 9,599,993 B2
(45) Date of Patent: Mar. 21, 2017

(54) THREE-DIMENSIONAL MANIPULATION OF TEAMS OF QUADROTORS

(71) Applicant: The Trustees of The University of Pennsylvania, Philadelphia, PA (US)

(72) Inventors: Vijay Kumar, Philadelphia, PA (US); Aleksandr Kushleyev, Philadelphia, PA (US); Daniel Mellinger, Philadelphia, PA (US)

(73) Assignee: THE TRUSTEES OF THE UNIVERSITY OF PENNSYLVANIA, Philadelphia, PA (US)

( * ) Notice: Subject to any disclaimer, the term of this patent is extended or adjusted under 35 U.S.C. 154(b) by 0 days.

(21) Appl. No.: 14/397,761

(22) PCT Filed: Apr. 30, 2013

(86) PCT No.: PCT/US2013/038769
§ 371 (c)(1),
(2) Date: Oct. 29, 2014

(87) PCT Pub. No.: WO2014/018147
PCT Pub. Date: Jan. 30, 2014

(65) Prior Publication Data
US 2015/0105946 A1    Apr. 16, 2015

Related U.S. Application Data

(60) Provisional application No. 61/640,249, filed on Apr. 30, 2012.

(51) Int. Cl.
*G01C 23/00* (2006.01)
*G05D 1/10* (2006.01)
(Continued)

(52) U.S. Cl.
CPC ........... *G05D 1/104* (2013.01); *B64C 39/024* (2013.01); *G08G 5/04* (2013.01); *B64C 2201/14* (2013.01)

(58) Field of Classification Search
CPC .. G05D 1/104; B64C 39/024; B64C 2201/14; B64C 27/32; B64C 2201/108; G08G 5/04
See application file for complete search history.

(56) References Cited

U.S. PATENT DOCUMENTS 5,414,631 A * 5/1995 Denoize ............... G01C 21/005
340/963
6,308,911 B1 * 10/2001 Schroeder ............. B63H 25/00
244/3.1
(Continued)

FOREIGN PATENT DOCUMENTS

WO    WO 2015/105597 A2    7/2015
WO    WO 2016/123201 A1    8/2016

OTHER PUBLICATIONS

Notification of First Office Action for Chinese Patent Application No. 201380034947.8 (Jun. 3, 2015).
(Continued)

*Primary Examiner* — Tuan C. To
(74) *Attorney, Agent, or Firm* — Jenkins, Wilson, Taylor & Hunt, P.A.

(57) ABSTRACT

A system and method is described for controlling flight trajectories of at least two flying vehicles towards goal positions. The system includes at least two flying vehicles with onboard inertial measurement units for determining and updating orientation, angular velocities, position and linear velocities of the at least two flying vehicles, a motion capture system to detect current position and velocity of each of the at least two flying vehicles, and a base controller in communication with the motion capture system and in communication with the plurality of flying vehicles. The
(Continued)

base controller calculates for each of the flying vehicles, at predetermined intervals of time, optimum trajectory paths using piece-wise smooth polynomial functions, applying weighting factors, and enforcing overlap constraints.

37 Claims, 16 Drawing Sheets

(51) Int. Cl.
  *B64C 39/02* (2006.01)
  *G08G 5/04* (2006.01)

(56) References Cited

U.S. PATENT DOCUMENTS

| | | | |
|---|---|---|---|
| 6,422,508 B1 | 7/2002 | Barnes | |
| 7,249,730 B1* | 7/2007 | Flippen, Jr. | F41G 7/346 244/3.1 |
| 8,019,544 B2* | 9/2011 | Needelman | B64G 1/361 701/13 |
| 8,380,362 B2* | 2/2013 | Beavin | G05D 1/0044 342/450 |
| 8,577,539 B1 | 11/2013 | Morrison et al. | |
| 2004/0264761 A1 | 12/2004 | Mas et al. | |
| 2006/0015247 A1* | 1/2006 | Speer | G01C 21/00 701/467 |
| 2007/0032951 A1 | 2/2007 | Tanenhaus et al. | |
| 2007/0235592 A1* | 10/2007 | Horn | B64G 1/645 244/158.1 |
| 2008/0125896 A1 | 5/2008 | Troy et al. | |
| 2009/0256909 A1 | 10/2009 | Nixon | |
| 2009/0290811 A1 | 11/2009 | Imani | |
| 2010/0114408 A1 | 5/2010 | Goossen | |
| 2011/0029235 A1* | 2/2011 | Berry | G01C 21/005 701/408 |
| 2011/0082566 A1* | 4/2011 | Herr | A61F 2/60 623/24 |
| 2012/0078510 A1 | 3/2012 | Ma et al. | |
| 2012/0101861 A1 | 4/2012 | Lindores | |
| 2012/0203519 A1* | 8/2012 | Louis | G01C 21/16 703/2 |
| 2012/0245844 A1 | 9/2012 | Lommel et al. | |
| 2012/0256730 A1* | 10/2012 | Scott | G01S 5/0221 340/10.1 |
| 2012/0286991 A1* | 11/2012 | Chen | G01S 19/04 342/357.23 |
| 2013/0325346 A1 | 12/2013 | McPeek | |
| 2014/0152839 A1 | 6/2014 | Menon | |

OTHER PUBLICATIONS

Michael et al., "Control of ensembles of aerial robots," Proc. of the IEEE, vol. 99, No. 9, pp. 1587-1602 (Sep. 2011).
Michael et al., "Cooperative manipulation and transportation with aerial robots," Auton. Robots, vol. 30, No. 1, pp. 73-86 (Jan. 2011).
Mellinger et al., "Trajectory generation and control for precise aggressive maneuvers," Intl. Symposium on Experimental Robotics (Dec. 2010).
Alonso-Mora et al., "Optimal reciprocal collision avoidance for multiple non-holonomic robots," Proceedings of the 10th International Symposium on Distributed Autonomous Robotic Systems (DARS), Berlin, Springer Press (Nov. 2010).
Mellinger et al., "Cooperative grasping and transport using multiple quadrotors," Intl. Symposium on Distributed Autonomous Systems, Lausanne, Switzerland (Nov. 2010).
Gillula et al., "Design of guaranteed safe maneuvers using reachable sets: Autonomous quadrotor aerobatics in theory and practice," Proc. of the IEEE Intl. Conf. on Robotics and Automation, pp. 1649-1654, Anchorage, AK (May 2010).
Lupashin et al., "A simple learning strategy for high-speed quadrocopter multi-flips," Proc. of the IEEE Intl. Conf. on Robot. and Autom., pp. 1642-1648, Anchorage, AK (May 2010).
Oung et al., "The distributed flight array," Proc. of the IEEE Intl. Conf. on Robotics and Automation, pp. 601-607, Anchorage, AK (May 2010).
He et al., "On the design and use of a micro air vehicle to track and avoid adversaries," The International Journal of Robotics Research, vol. 29, pp. 529-546 (2010).
Bachrach et al., "Autonomous flight in unknown indoor environments," International Journal of Micro Air Vehicles, vol. 1, No. 4, pp. 217-228 (Dec. 2009).
Fink et al., "Planning and control for cooperative manipulation and transportation with aerial robots," Proceedings of the Intl. Symposium of Robotics Research, Luzern, Switzerland (Aug. 2009).
Tedrake, "LQR-Trees: Feedback motion planning on sparse randomized trees," Proceedings of Robotics: Science and Systems, Seattle, WA (Jun. 2009).
Bullo et al., Distributed Control of Robotic Networks: A Mathematical Approach to Motion Coordination Algorithms. Applied Mathematics Series, Princeton University Press (2009).
van den Berg, "Reciprocal n-body collision avoidance," International Symposium on Robotics Research (2009).
Tanner et al., "Flocking in fixed and switching networks," IEEE Trans. Autom. Control, vol. 52, No. 5, pp. 863-868 (May 2007).
Gurdan et al., "Energy-efficient autonomous four-rotor flying robot controlled at 1khz," Proceedings of the IEEE Intl. Conf. on Robotics and Automation, Roma, Italy (Apr. 2007).
Schouwenaars et al., "Multi-vehicle path planning for non-line of sight communications," American Control Conference (2006).
Schouwenaars et al., "Receding horizon path planning with implicit safety guarantees," American Control Conference, pp. 5576-5581 (2004).
Desai et al., "Modeling and control of formations of nonholonomic mobile robots," IEEE Trans. Robot., vol. 17, No. 6, pp. 905-908 (Dec. 2001).
Egerstedt et al., "Formation constrained multi-agent control," IEEE Trans. Robot. Autom., vol. 17, No. 6, pp. 947-951 (Dec. 2001).
Beard et al., "A coordination architecture for spacecraft formation control," IEEE Trans. Control Syst. Technol., vol. 9, No. 6, pp. 777-790 (Nov. 2001).
Richards et al., "Plume avoidance maneuver planning using mixed integer linear programming," AIAA Guidance, Navigation and Control Conference and Exhibit (2001).
Schouwenaars et al., "Mixed integer programming for multi-vehicle path planning," European Control Conference, pp. 2603-2608 (2001).
Nieuwstadt et al., "Real-time trajectory generation for differentially flat systems," International Journal of Robust and Nonlinear Control, vol. 8, pp. 995-1020 (1998).
Parrish et al., Animal Groups in Three Dimensions. Cambridge University Press, New York (1997).
Wagner et al., "Subdimensional expansion for multirobot path planning," Artificial Intelligence, vol. 219, pp. 1-24, (2015).
Shen et al., "Tightly-coupled monocular visual-inertial fusion for autonomous flight of rotorcraft MAVs," IEEE Intl. Conf. on Robot. and Autom., Seattle, Washington, USA (2015).
Goldenberg et al., Enhanced partial expansion A, Journal of Artificial Intelligence Research, vol. 50, No. 1, pp. 141-187 (2014).
Specht E., "The best known packings of equal circles in a square," http://hydra.nat.uni-magdeburg.de/packing/csq/csq.html (Oct. 2013).
Yu et al., "Planning optimal paths for multiple robots on graphs," in Proceedings of 2014 IEEE International Conference on Robotics and Automation (ICRA), pp. 3612-3617, (2013).
de Wilde et al,. "Push and Rotate: Cooperative Multi-Agent Path Planning," Proceedings of the 2013 International Conference on Autonomous Agents and Multi-agent Systems (AAMAS), p. 87-94 (2013).
Forster et al., "Collaborative monocular SLAM with multiple Micro Aerial Vehicles," IEEE/RSJ Conference on Intelligent Robots and Systems, Tokyo, Japan (2013).
Turpin et al., "CAPT: Concurrent assignment and planning of trajectories for multiple robots," The International Journal of Robotics Research 2014, vol. 33(1) p. 98-112 (2013).

(56) References Cited

OTHER PUBLICATIONS

Schmid et al., "Towards autonomous MAV exploration in cluttered indoor and outdoor environments," RSS 2013 Workshop on Resource-Eficient Integration of Perception, Control and Navigation for Micro Air Vehicles (MAVs), Berlin, Germany (2013).
Ayanian et al., "Decentralized multirobot control in partially known environments with dynamic task reassignment," IFAC Workshop on Distributed Estimation and Control in Networked Systems, Santa Barbara, CA, pp. 311-316 (Sep. 2012).
Forte et al., "Impedance Control of an Aerial Manipulator," American Control Conference (ACC), Montreal, Canada, pp. 3839-3844 (2012).
Kelly et al., "Visual-inertial sensor fusion: Localization, mapping and sensor-to-sensor self-calibration," pp. 1-53 (Aug. 2010).
Trawny et al., "Cooperative multi-robot localization under communication constraints," IEEE International Conference on Robotics and Automation, Kobe, Japan, pp. 4394-4400 (May 2009).
van den Berg et al., "Centralized path planning for multiple robots: Optimal decoupling into sequential plans," in Proceedings of Robotics: Science and Systems (RSS), (2009)
van den Berg J., "RVO2 library documentation," http://gamma.cs.unc.edu/RVO2/documentation/2.0/index.html (2008).
Civera et al., "Inverse depth parameterization for monocular SLAM," IEEE Trans. on Robot., vol. 24, No. 5, pp. 932-945 (Oct. 2008).
Kloder et al., "Path planning for permutation-invariant multirobot formations," IEEE Transactions on Robotics, vol. 22, No. 4, pp. 650-665 (Aug. 2006).
Peng et al., "Coordinating multiple robots with kinodynamic constraints along specified paths," The International Journal of Robotics Research (IJRR), vol. 24, No. 4, pp. 295-310, (2005).
Hastings et al., "Optimization of large-scale, real-time simulations by spatial hashing," Proceedings of the 2005 Summer Computer Simulation Conference pp. 9-17 (2005).
Howard et al., "Multi-robot mapping using manifold representations," IEEE International Conference on Robotics and Automation, New Orleans, Louisiana, pp. 4198-4203 (Apr. 2004).
Lowe, "Distinctive image features from scale-invariant keypoints," International Journal of Computer Vision, vol. 60, No. 2, pp. 91-110 (2004).
Ansar et al., "Linear pose estimation from points or lines," IEEE Transactions on Pattern Analysis and Machine Intelligence, vol. 25, No. 5, pp. 1-12 (Apr. 2003).
Tomlin et al., "Conflict resolution for air traffic management: a study in multi-agent hybrid systems," IEEE Transactions on Automatic Control, vol. 43, pp. 509-521, (1998).
Buckley S., "Fast motion planning for multiple moving robots," Proceedings of the 1989 IEEE International Conference on Robotics and Automation (ICRA p. 322-326 (1989).
Kant et al., "Toward efficient trajectory planning: The path-velocity decomposition," The International Journal of Robotics Research (IJRR), vol. 5, No. 3, pp. 72-89, (1986).
Erdmann et al., "On multiple moving objects," Algorithmica, vol. 2, pp. 1419-1424, (1986).
Hart et al., "A formal basis for the heuristic determination of minimum cost paths," IEEE Transactions on Systems Science and Cybernetics, vol. 4, No. 2, pp. 100-107, (Jul. 1968).
Communication of European publication number and information on the application of Article 67(3) EPC for European Patent Application No. 14878289.9 (Sep. 7, 2016).
Zou et al., "CoSLAM: Collaborative visual SLAM in dynamic environments," IEEE Transactions on Pattern Analysis Machine Intelligence, vol. 35, No. 2, pp. 354-366 (2013).
Shen et al., "State Estimation for Indoor and Outdoor Operation with a Micro-Aerial Vehicle," International Symposium on Experimental Robotics (ISER) pp. 1-15 (May 2012).
European Search Report and Opinion for EP Application No. 13 823 648.4 (May 23, 2016).
Notification of Transmittal of the International Search Report and the Written Opinion of the International Searching Authority, or the Declaration for International Application No. PCT/US2016/015093 (May 19, 2016).
Official Office Action for Austrailian Application No. 2013293507 (Feb. 4, 2016).
Commonly assigned, co-pending PCT International Patent Application No. PCT/US2016/015093 titled, "Systems, Devices, and Methods for Robotic Remote Sensing for Precision Agriculture," (unpublished, filed Jan. 27, 2016).
Commonly assigned, co-pending U.S. Appl. No. 62/217,301 titled, "Systems and Methods for Generating Safe Trajectories for Multi-Vehicle Teams," (unpublished, filed Sep. 11, 2015).
Notification of Transmittal of the International Search Report and the Written Opinion of the International Searching Authority, or the Declaration for International Application No. PCT/US2014/067822 (Aug. 7, 2015).
Commonly assigned, co-pending U.S. Appl. No. 62/196,762 titled, "Systems, Devices, and Methods for On-Board Sensing and Control of Micro Aerial Vehicles," (unpublished, filed Jul. 24, 2015).
Communication of European publication number and information on the application of Article 67 (3) EPC for Application No. 13823648.4 (Feb. 11, 2015).
Notification of Transmittal of the International Search Report and the Written Opinion of the International Searching Authority, or the Declaration for International Application No. PCT/US2013/038769 (Jan. 17, 2014).
Hesch et al., "Camera-imu-based localization: Observability analysis and consistency improvement," The Intl. Journal of Robotics Research, vol. 33, No. 1, pp. 182-201 (2014).
Thomas et al., "Toward Image Based Visual Servoing for Aerial Grasping and Perching," IEEE Intl. Conf. on Robot and Autom., Hong Kong, China, pp. 2113-2118 (2014).
Martinelli, "Visual-inertial structure from motion: Observability and resolvability," IEEE/RSS Intl. Conf. on Intell. Robots and Systems (IROS 2013), pp. 4235-4242 (Nov. 2013).
Schmid et al., "Stereo vision based indoor/outdoor navigation for flying robots," Proc. of the IEEE/RSJ Intl. Cozzi: on Intell. Robots and Syst., Tokyo, Japan, pp. 1-8 (Nov. 2013).
Lynen et al., "A robust and modular multi-sensor fusion approach applied to MAV navigation," Proc. of the IEEE/RSJ Intl. Conf. on Intell. Robots and Syst., Tokyo, Japan, pp. 1-7 (Nov. 2013).
"Kalman filter," Wikipedia, pp. 1-31 http://en.wikipedia.org/wiki/Kalman_filter (page last modified May 24, 2016).
Richter et al., "Polynomial trajectory planning for quadrotor flight," Proc. of the IEEE Intl. Conf on Robot. and Autom., Karlsruhe, Germany, pp. 1-8 (May 2013).
Shen et al., "Vision-based state estimation and trajectory control towards high-speed flight with a quadrotor," Proc. of Robot.: Sci. and Syst., Berlin, Germany, pp. 1-8 (May 2013).
Shen et al., "Vision-based state estimation for autonomous rotorcraft MAVs in complex environments," Proc. of the IEEE Intl. Conf. on Robot and Autom., Karlsruhe, Germany, pp. 1-7 (May 2013).
Li et al., "Real-time motion tracking on a cellphone using inertial sensing and a rolling-shutter camera," IEEE International Conference on Robotics and Automation, pp. 4712-4719 (May 2013).
Lee et al., "Nonlinear Robust Tracking Control of a Quadrotor UAV on SE(3)," Asian Journal of Control, vol. 15, 2 No. 2, pp. 391-408 (May 2013).
Ozaslan et al., "Inspection of Penstocks and Featureless Tunnel-like Environments using Micro UAVs," Field and Service Robotics Conference (FSR), Brisbane, Australia, pp. 123-136 (2013).
Sucan et al., "The Open Motion Planning Library," IEEE Robot Autom. Mag., vol. 19, No. 4, pp. 72-82 http://ompl.kavrakilab.org (Dec. 2012).
Fraundorfer et al., "Vision-based autonomous mapping and exploration using a quadrotor MAV," Proc. of the IEEE/RSJ Intl. Conf on bztell. Robots and Syst., Vilamoura, Algarve, Portugal, pp. 1-8 (Oct. 2012).
Scherer et al., "River mapping from a flying robot: state estimation, river detection, and obstacle mapping," Auton. Robots, vol. 33, No. 1-2, pp. 189-214 (Aug. 2012).

(56) References Cited

OTHER PUBLICATIONS

Kottas et al., "On the consistency of vision-aided inertial navigation," Proc. of the Intl. Sym. on Exp. Robot., Quebec. Canada, pp. 1-15 (Jun. 2012).

Weiss et al., "Real-time onboard visual-inertial state estimation and self-calibration of mays in unknown environments," Proc. of the IEEE Intl. Conf on Robot. and Autom., Saint Paul, MN, pp. 957-964 (May 2012).

de Croon et al., "Sub-sampling: Real-time vision for micro air vehicles," Robot. and Autom. Syst., vol. 60, No. 2, pp. 167-181 (Feb. 2012).

Turpin et al., "Trajectory design and control for aggressive formation flight with quadrotors," Autonomous Robots, vol. 33, pp. 143-156 (Feb. 2012).

Michael et al., "Collaborative mapping of an earthquake-damaged building via ground and aerial robots," Journal of Field Robotics, vol. 29, No. 5, pp. 832-841 (2012).

Shen et al., "Autonomous indoor 3D exploration with a Micro-Aerial Vehicle," IEEE Intl. Conf. on Robot. and Autom., St. Paul, Minnesota, USA, pp. 9-15 (2012).

Tomic et al., "Toward a Fully Autonomous UAV: Research platform for indoor and outdoor urban search and rescue," IEEE Robot. Autom. Mag., vol. 19, No. 3, pp. 46-56 (2012).

Kushleyev et al., "Planning for landing site selection in the aerial supply delivery." Proc. of the IEEE/RSJ Intl. Conf. on Intell. Robots and Syst., San Francisco, CA, pp. 1146-1153 (Sep. 2011).

Huang et al., "Visual odometry and mapping for autonomous flight using an RGB-D camera," Proc. of the Intl. Spit. of Robot. Research, Flagstaff, AZ, pp. 1-16 (Aug. 2011).

Bills et al., "Autonomous MAV flight in indoor environments using single image perspective cues," Proc. of the IEEE Intl. Conf. on Robot, and Autom., Shanghai, China, pp. 5776-5783 (May 2011).

Mellinger et al., "Minimum Snap Trajectory Generation and Control for Quadrotors," IEEE International Conference on Robotics and Automation, pp. 2520-2525 (May 2011).

Kuemmerle et al., "g2o: A general framework for graph optimization," Proc. of the IEEE Intl. Conf. on Robot. and Autom., Shanghai, China, pp. 3607-3613 (May 2011).

Shen et al., "Autonomous multi-floor indoor navigation with a computationally constrained MAV," Proc. of the IEEE Intl. Conf. on Robot. and Autom., Shanghai, China, pp. 20-25 (May 2011).

De Vries et al., "Cooperative Control of Swarms of Unmanned Aerial Vehicles," 49th AIAA Aerospace Sciences Meeting including the New Horizons Forum and Aerospace Exposition, pp. 1-23 (Jan. 2011).

Jones et al., "Visual-inertial navigation, mapping and localization: A scalable real-time causal approach," International Journal of Robotics Research, pp. 1-38 (Jan. 2011).

Grzonka et al., "A fully autonomous indoor quadrotor," IEEE Trans. Robot., vol. PP, No. 99, pp. 1-11 (2011).

Bachrach et al., "RANGE-robust autonomous navigation in GPS-denied environments," J. Field Robotics, vol. 28, No. 5, pp. 644-666 (2011).

Weiss et al., "Monocular-SLAM-based navigation for autonomous micro helicopters in GPS denied environments," Journal of Field Robotics, vol. 28, No. 6, pp. 854-874 (2011).

Lee et al., "Geometric tracking control of a quadrotor UAV on SE(3)," Proc. of the Intl. Conf. on Decision and Control, Atlanta, GA, pp. 5420-5425 (Dec. 2010).

Carlson, "Mapping large urban environments with GPS-aided SLAM," Ph.D. dissertation; CMU, Pittsburgh, PA, pp. 1-122 (Jul. 2010).

Mei et al., "RSLAM: A system for large-scale mapping in constant-time using stereo," Intl J. of Computer Vision, pp. 1-17 (Jun. 2010).

Strasdat et al., "Scale drift-aware large scale monocular SLAM," Proc. of Robot.: Sci. and Syst., Zaragoza, Spain, pp. 1-8 (Jun. 2010).

Karaman et al., "Incremental sampling-based algorithms for optimal motion planning," Proc. of Robot.: Sci. and Syst., Zaragoza, Spain pp. 1-8 (Jun. 2010).

Michael et al., "The Grasp Multiple Micro UAV TestBed," IEEE Robotics and Automation Magazine, vol. 17, No. 3, pp. 56-65 (Sep. 2010).

Moore et al., "Simultaneous local and global state estimation for robotic navigation," Proc. of the IEEE Intl. Conf. on Robot. and Autom., Kobe, Japan, pp. 3794-3799 (May 2009).

Schleicher et al., "Real-time hierarchical GPS aided visual SLAM on urban environments," Proc. of the IEEE Intl. Conf. on Robot. and Autom., Kobe, Japan, pp. 4331-4386 (May 2009).

Esme, "Kalman Filter for Dummies," Bilgin's Blog, pp. 1-15, http://bilgin.esme.org/BitsBytes/KalmanFilterforDummies.aspx (Mar. 2009).

Klein et al.; "Parallel Tracking and Mapping on a Camera Phone," International Symposium on Mixed and Augmented Reality (ISMAR), pp. 1-4 (2009).

Wagner et al., "Robust and Unobtrusive Marker Tracking on Mobile Phones," International Symposium on Mixed and Augmented Reality (ISMAR), pp. 1-7 (Sep. 2008).

Kaess et al., "iSAM: Incremental smoothing and mapping," IEEE Trans. on Robot., manuscript, pp. 1-14 (Sep. 2008).

Kopfstedt et al., "Control of Formations of UAVs for Surveillance and Reconnaissance Missions," Proceedings of the 17th World Congress, The International Federation of Automatic Control, pp. 5161-5166 (Jul. 2008).

Olson, "Robust and efficient robotic mapping," Ph.D. dissertation, MIT. Cambridge, MA, pp. 1-10 (Jun. 2008).

Klein et al., "Parallel tracking and mapping for small AR workspaces," Proc. Sixth IEEE and ACM International Symposium on Mixed and Augmented Reality (ISMAR'07), Nara, Japan, pp. 1-10 (Nov. 2007).

Moreno-Noguer et al. "Accurate non-iterative 0(n) solution to the PnP problem," Proc. of the IEEE Intl. Conf on Computer Vision, Rio de Janeiro, Brazil, pp. 1-8 (Oct. 2007).

Rosten et al., "Machine learning for high-speed corner detection," Proc. of the European Conf on Computer Vision, Graz, Austria, pp. 1-14 (May 2006).

Bay et al., "SURF: Speeded up robust features," Proc. of the European Conf on Computer Vision, Graz, Austria, pp. 1-14 (May 2006).

Kamal et al., "Real Time Trajectory Planning for UAVs Using MILP," Proceedings of the 44th IEEE Conference on Decision and Control, and the European Control Conference 2005, pp. 3381-3386 (Dec. 2005).

Foxlin, "Pedestrian Tracking with Shoe-Mounted Inertial Sensors," Computer Graphics and Applications, vol. 25, No. 6, pp. 38-46 (Nov./Dec. 2005).

Roumeliotis et al., "Stochastic cloning: A generalized framework for processing relative state measurements," Proc. of the IEEE Intl. Conf on Robot. and Autom., Washington, DC, pp. 1788-1795 (May 2002).

Lefebvre et al., "Comment on 'A new method for the nonlinear transformation of means and covariances in filters and estimators'," IEEE Trans. Autom. Control, vol. 47, No. 8, pp. 1-10 (2001).

Welch et al., "An Introduction to the Kalman Filter," SIGGRAPH 2001, Course 8, pp. 1-47 (2001).

Julier et al., "A new extension of the kalman filter to nonlinear systems," Proc. of SPIE, I. Kadar, Ed., vol. 3068, pp. 182-193 (Jul. 1997).

Smith et al., "Estimating uncertain spatial relationships in robotics," Proc. of the IEEE Intl. Conf. on Robot. and Autom., vol. 4, Raleigh, NC, pp. 167-193 (Mar. 1987).

Lucas et al., "An iterative image registration technique with an application to stereo vision," Proc. of the 7th Intl. Joint Conf. on Artificial Intelligence, Vancouver, Canada, pp. 674-679 (Aug. 1981).

Maybeck. "Chapter 1 Introduction," Stochastic models, estimation, and control, vol. 1, pp. 1-16, Academic Press, Inc. (1979).

Welch et al., "SCAAT: Incremental Tracking with Incomplete Information," University of North Carolina at Chapel Hill, pp. 1-12 (1997).

"Hummingbird quadrotor," Ascending Technologies; http://www.asctec.de/ (publication date unknown; downloaded from the internet May 25, 2016).

(56) References Cited

OTHER PUBLICATIONS

"Pelican quadrotor," Ascending Technologies; GmbH, http://www.asctec.de/ (publication date unknown; downloaded from the Internet May 25, 2016).

* cited by examiner (a) Pitch angle step input response   (b) Data for the flipping maneuver (a) Position error   (b) Position step input response (a) Top view          (b) Error time histories (a) Error Data          (b) Time-Separated Trajectory Following (a) Time-step overlap constraints are not enforced    (b) Time-step overlap constraints are enforced (a) RMSE for 30 trials at various speeds (b) t = 1.0s (c) t = 1.5s (d) t = 1.8s (a) Four Hummingbirds - Top View  (b) kQuad1000 (red), kQuad65 (magenta), and two Hummingbirds (green and blue) - Perspective View

THREE-DIMENSIONAL MANIPULATION OF TEAMS OF QUADROTORS

CROSS-REFERENCE TO RELATED APPLICATIONS

This application is the National Stage of International Application No. PCT/US2013/038769, filed Apr. 30, 2013, which claims the benefit of and priority to U.S. Provisional Application No. 61/640,249, filed Apr. 30, 2012, the entireties of which applications are incorporated herein by reference for any and all purposes.

TECHNICAL FIELD

This invention is in the field of multi-rotor aerial vehicles. More particularly, the invention concerns three dimensional manipulation of a team of quadrotors with complex obstacles by generating optimal trajectories using mixed integer quadratic programs (MIQPs) and using integer constraints to enforce collision avoidance.

BACKGROUND

The last decade has seen rapid progress in micro aerial robots, autonomous aerial vehicles that are smaller than 1 meter in scale and 1 kg or less in mass. Winged aircrafts can range from fixed-wing vehicles to flapping-wing vehicles, the latter mostly inspired by insect flight. Rotor crafts, including helicopters, coaxial rotor crafts, ducted fans, quadrotors and hexarotors, have proved to be more mature with quadrotors being the most commonly used aerial platform in robotics research labs. In this class of devices, the Hummingbird quadrotor sold by Ascending Technologies, GmbH, with a tip-to-tip wingspan of 55 cm, a height of 8 cm, mass of about 500 grams including a Lithium Polymer battery and consuming about 75 Watts, is a remarkably capable and robust platform.

Multi-rotor aerial vehicles have become increasingly popular robotic platforms because of their mechanical simplicity, dynamic capabilities, and suitability for both indoor and outdoor environments. In particular, there have been many recent advances in the design, control and planning for quadrotors, rotorcrafts with four rotors. As will be explained below, the invention relates to a method for generating optimal trajectories for heterogeneous quadrotor teams like those shown in FIG. 1 in environments with obstacles.

Micro aerial robots have a fundamental payload limitation that is difficult to overcome in many practical applications. However, larger payloads can be manipulated and transported by multiple UAVs either using grippers or cables. Applications such as surveillance or search and rescue that require coverage of large areas or imagery from multiple sensors can be addressed by coordinating multiple UAVs, each with different sensors.

Trajectories that quadrotors can follow quickly and accurately should be continuous up to the third derivative of position (or C 3). This is because, for quadrotors, discontinuities in lateral acceleration require instantaneous changes in roll and pitch angles and discontinuities in lateral jerk require instantaneous changes in angular velocity. Finding C 3 trajectories requires planning in a high-dimensional search space that is impractical for methods using reachability algorithms, incremental search techniques or LQR-tree-based searches. The problem is exacerbated when planning for multiple vehicles as this further expands the dimension of the search space.

The invention addresses the issue of scaling down the quadrotor platform to develop a truly small micro UAV. The most important and obvious benefit of scaling down in size is the ability of the quadrotor to operate in tightly constrained environments in tight formations. While the payload capacity of the quadrotor falls dramatically, it is possible to deploy multiple quadrotors that cooperate to overcome this limitation. Again, the small size is beneficial because smaller vehicles can operate in closer proximity than large vehicles. Another interesting benefit of scaling down is agility. Smaller quadrotors exhibit higher accelerations allowing more rapid adaptation to disturbances and higher stability.

Prior work by the inventors showed that the dynamic model for the quadrotor is differentially flat. The inventors use this fact to derive a trajectory generation algorithm that allows one to naturally embed constraints on desired positions, velocities, accelerations, jerks and inputs while satisfying requirements on smoothness of the trajectory. The inventors extend that method in accordance with the present invention to include multiple quadrotors and obstacles. The method allows for different sizes, capabilities, and varying dynamic effects between different quadrotors. The inventors enforce collision avoidance using integer constraints which transforms their quadratic program (QP) from into a mixed-integer quadratic program (MIQP).

Prior work by the inventors also draws from the extensive literature on mixed-integer linear programs (MILPs) and their application to trajectory planning from Schouwenaars et al., "Decentralized Cooperative Trajectory Planning of Multiple Aircraft with Hard Safety Guarantees," Proceedings of the AIAA Guidance, Navigation, and Control Conference and Exhibit, Providence, R.I., August 2004. The methods described herein build upon such work.

SUMMARY

The methods and systems described herein demonstrate the power and flexibility of integer constraints in similar trajectory planning problems for both fixed-wing aerial vehicles and rotorcraft. A key difference in this approach is the use of piece-wise smooth polynomial functions to synthesize trajectories in the flat output space. Using piece-wise smooth polynomial functions allows to enforce continuity between waypoints up to any desired derivative of position. Another difference in trajectory generation as described herein is the use of a quadratic cost function resulting in a MIQP as opposed to a MILP.

In exemplary embodiments, a system is described for controlling flight trajectories of at least two flying vehicles towards goal positions. The system includes at least two flying vehicles with onboard inertial measurement units for determining and updating orientation, angular velocities, position and linear velocities of the at least two flying vehicles, a motion capture system to detect current position and velocity of each of the at least two flying vehicles, and a base controller in communication with the motion capture system and in communication with the plurality of flying vehicles. The base controller calculates for each of the flying vehicles, at predetermined intervals of time, optimum trajectory paths using piece-wise smooth polynomial functions, applying weighting factors, and enforcing overlap constraints. The base controller also, based on the calculated optimum trajectory path, sends commands to each of the flying vehicles to control, individually, their state, causing the at least two flying vehicles to follow the calculated optimum trajectory path while avoiding collisions.

The invention also includes a trajectory generation method for controlling states of at least two flying vehicles towards goal positions and orientations. In an exemplary embodiment, the method includes determining orientation and angular velocities of the flying vehicles, controlling the orientation and angular velocities of the flying vehicles by controlling at least one motor of the flying vehicles, determining current position and velocity of each of the flying vehicles, and controlling the position and velocity of each of the flying vehicles by specifying the desired orientation and angular velocities and the net thrust required from the at least one motor. For each of the flying vehicles, at predetermined intervals of time, optimum trajectory paths are calculated by using piece-wise smooth polynomial functions and applying weighting factors and enforcing overlap constraints. Then, based on the calculated optimum trajectory paths, commands are sent to each of the flying vehicles to control, individually, their state, causing such flying vehicles to follow the calculated optimum trajectory path while avoiding collisions. The updated current position and velocity of each of the flying vehicles is provided and the process is iteratively executed at a plurality of the pre-determined intervals of time. In an exemplary embodiment, each state of a flying vehicle includes its orientation and angular velocity, and position and linear velocity. The orientation error may be estimated and the orientation is controlled on-board each of the flying vehicles.

During calculation of the optimum trajectory paths, the weighting factors applied to each of the at least two flying vehicles may be dissimilar for dissimilar flying vehicles. Also, integer constraints may be used during calculation of the optimum trajectory paths to enforce collision constraints with obstacles and other vehicles and to optimally assign goal positions for the at least two flying vehicles. Calculating an optimum trajectory path for each flying vehicle may also comprise generating trajectories that smoothly transition through $n_w$ desired waypoints at specified times, $t_w$, while minimizing the integral of the $k_r$th derivative of position squared for $n_q$ quadrotors in accordance with the equation:

$$\min \sum_{q=1}^{n_q} \int_{t_0}^{t_{n_w}} \left\| \frac{d^{k_r} r_{Tq}}{dt^{k_r}} \right\|^2 dt$$

s.t. $r_{Tq}(t_w) = r_{wq}$, $w = 0, \ldots, n_w; \forall q$ $\left. \frac{d^j x_{Tq}}{dt^j} \right|_{t=t_w} = 0$ or free, $w = 0, n_w; j = 1, \ldots, k_r; \forall q$ $\left. \frac{d^j y_{Tq}}{dt^j} \right|_{t=t_w} = 0$ or free, $w = 0, n_w; j = 1, \ldots, k_r; \forall q$ $\left. \frac{d^j z_{Tq}}{dt^j} \right|_{t=t_w} = 0$ or free, $w = 0, n_w; j = 1, \ldots, k_r; \forall q$ where $r_{Tq} = [x_{Tq}, y_{Tq}, z_{Tq}]$ represents the trajectory for quadrotor q and $r_{wq}$ represents desired waypoints for quadrotor q. Collision avoidance among the at least two flying vehicles also may be provided by modeling the flying vehicles as a rectangular prism oriented with a world frame with side lengths $l_x$, $l_y$, and $l_z$ that are large enough so that the flying machines may roll, pitch, and yaw to any angle and stay within the prism. The prism may then be navigated through an environment with $n_o$ convex obstacles, where each convex obstacle o is represented by a convex region in configuration space with $n_f(o)$ faces, and for each face f the condition that the flying vehicle's desired position at time $t_k$, $r_{Tq}(t_k)$, is outside of obstacle o is represented as:

$$n_{of} \cdot r_{Tq}(t_k) \leq s_{of}$$

where $n_{of}$ is the normal vector to face f of obstacle o in configuration space and $s_{of}$ is a scalar, whereby if the equation for the flying vehicle's positions at time tk is satisfied for at least one of the faces, then the rectangular prism, and hence the flying machine, is not in collision with the obstacle. A condition that flying machine q does not collide with an obstacle o at time $t_k$ further may be enforced with binary variables, $b_{qofk}$, as:

$$n_{of} \cdot r_{Tq}(t_k) \leq s_{of} + Mb_{qofk} \quad \forall f = 1, \ldots, n_f(o)$$

$$b_{qofk} = 0 \text{ or } 1 \quad \forall f = 1, \ldots, n_f(o)$$

$$\sum_{f=1}^{n_f(o)} b_{qofk} \leq n_f(o) - 1$$

where M is a large positive number.

In exemplary embodiments, the latter equation is introduced into the former equation for all $n_q$ flying machines for all obstacles at $n_k$ intermediate time steps between waypoints. The flying vehicles may be maintained at a safe distance from each other when transitioning between waypoints on a flying vehicle's trajectory path by enforcing a constraint at $n_k$ intermediate time steps between waypoints which can be represented mathematically for flying vehicles 1 and 2 by the following set of constraints:

$\forall t_k: x_{T1}(t_k) - x_{T2}(t_k) \leq d_{x12}$ or $x_{T2}(t_k) - x_{T1}(t_k) \leq d_{x21}$ or $y_{T1}(t_k) - y_{T2}(t_k) \leq d_{y12}$ or $y_{T2}(t_k) - y_{T1}(t_k) \leq d_{y21}$ where the d terms represent safety distances between flying vehicles 1 and 2. When the flying vehicles are axially symmetric, $d_{x12} = d_{x21} = d_{y12} = d_{y21}$.

In further exemplary embodiments, the integer constraints are used to find the optimal goal assignments for the flying vehicles by applying for each quadrotor q and goal g the following integer constraints:

$x_{Tq}(t_{n_w}) \leq x_g + M\beta_{qg}$ $x_{Tq}(t_{n_w}) \geq x_g - M\beta_{qg}$ $y_{Tq}(t_{n_w}) \leq y_g + M\beta_{qg}$ $y_{Tq}(t_{n_w}) \geq y_g - M\beta_{qg}$ $z_{Tq}(t_{n_w}) \leq z_g + M\beta_{qg}$ $z_{Tq}(t_{n_w}) \geq z_g - M\beta_{qg}$ where $\beta_{qg}$ is a binary variable used to enforce an optimal goal assignment. The following constraint may be further applied to guarantee that at least $n_g$ quadrotors reach the desired goal positions:

$$\sum_{q=1}^{n_q} \sum_{g=1}^{n_g} \beta_{qg} \leq n_g n_q - n_g.$$

In other exemplary embodiments of the method of the invention, the method includes the steps of organizing the flying vehicles into a plurality of groups, wherein each of the plurality of groups are coordinated independently, and generating a trajectory for each of the plurality of groups to group goal positions. In such embodiments, an environment for the flying vehicles is partitioned into nr convex sub-regions where each sub-region contains the same number of flying vehicle start and goal positions, and separate trajectories are generated for the flying vehicles inside each sub-region whereby the flying vehicles are required to stay inside their own sub-regions using linear constraints on the positions of the flying vehicles.

BRIEF DESCRIPTION OF THE DRAWINGS

The above and other features and advantages of the invention will be apparent from the following detailed description of the figures, of which.

DETAILED DESCRIPTION OF ILLUSTRATIVE EMBODIMENTS

Figure 1:
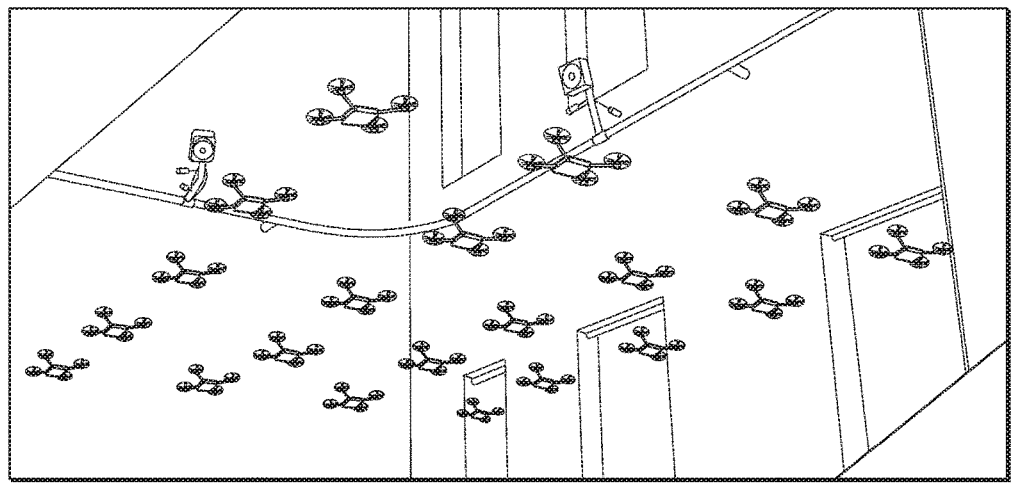
FIG. 1 illustrates a formation of 20 micro quadrotors in flight.

Certain specific details are set forth in the following description with respect to FIGS. 1-20 to provide a thorough understanding of various embodiments of the invention. Certain well-known details are not set forth in the following disclosure, however, to avoid unnecessarily obscuring the various embodiments of the invention. Those of ordinary skill in the relevant art will understand that they can practice other embodiments of the invention without one or more of the details described below. Also, while various methods are described with reference to steps and sequences in the following disclosure, the description is intended to provide a clear implementation of embodiments of the invention, and the steps and sequences of steps should not be taken as required to practice the invention.

Micro Quadrotors

It is useful to develop a simple physics model to analyze a quadrotor's ability to produce linear and angular accelerations from a hover state. If the characteristic length is L, the rotor radius R scales linearly with L. The mass scales as L3 and the moments of inertia as L5. On the other hand, the lift or thrust, F, and drag, D, from the rotors scale with the cross-sectional area and the square of the blade-tip velocity, v. If the angular speed of the blades is defined by $\omega=v/L$, $F \sim \omega^2 L^4$ and $D \sim \omega^2 L^4$, the linear acceleration a scales as $a \sim \omega^2 L^4/L^3 = \omega^2 L$. Thrusts from the rotors produce a moment with a moment arm L. Thus the angular acceleration $a \sim \omega^2 L^5/L^5 = \omega^2$.

The rotor speed, $\omega$, also scales with length since smaller motors produce less torque which limits their peak speed because of the drag resistance that also scales the same way as lift. There are two commonly accepted approaches to study scaling in aerial vehicles. Mach scaling is used for compressible flows and essentially assumes that the tip velocities are constant leading to $\omega \sim 1/R$. Froude scaling is used for incompressible flows and assumes that for similar aircraft configurations, the Froude number, $v^2/L_g$, is constant. Here g is the acceleration due to gravity. This yields $\omega \sim 1/(R)^{1/2}$. However, neither Froude or Mach number similitudes take motor characteristics nor battery properties into account. While motor torque increases with length, the operating speed for the rotors is determined by matching the torque-speed characteristics of the motor to the drag versus speed characteristics of the propellers. Further, the motor torque depends on the ability of the battery to source the required current. All these variables are tightly coupled for smaller designs since there are fewer choices available at smaller length scales. Finally, the assumption that propeller blades are rigid may be wrong and the performance of the blades can be very different at smaller scales, the quadratic scaling of the lift with speed may not be accurate. Nevertheless, these two cases are meaningful the maneuverability of the craft.

Froude scaling suggests that the acceleration is independent of length while the angular acceleration $\alpha \sim L^{-1}$. On the other hand, Mach scaling leads to the conclusion that $\alpha \sim L$ while $\alpha \sim L^{-2}$. Since quadrotors must rotate (exhibit angular accelerations) in order to translate, smaller quadrotors are much more agile. There are two design points that are illustrative of the quadrotor configuration. The Pelican quadrotor from Ascending Technologies is equipped with sensors (approx. 2 kg gross weight, 0.75 m diameter, and 5400 rpm nominal rotor speed at hover) and consumes approximately 400 W of power. The Hummingbird quadrotor from Ascending Technologies (500 grams gross weight, approximately 0.5 m diameter, and 5000 rpm nominal rotor speed at hover) without additional sensors consumes about 75 W. The inventors outline herein a design for a quadrotor which is approximately 40% of the size of the Hummingbird, 15% of its mass, and consuming approximately 20% of the power for hovering.

Figure 2:
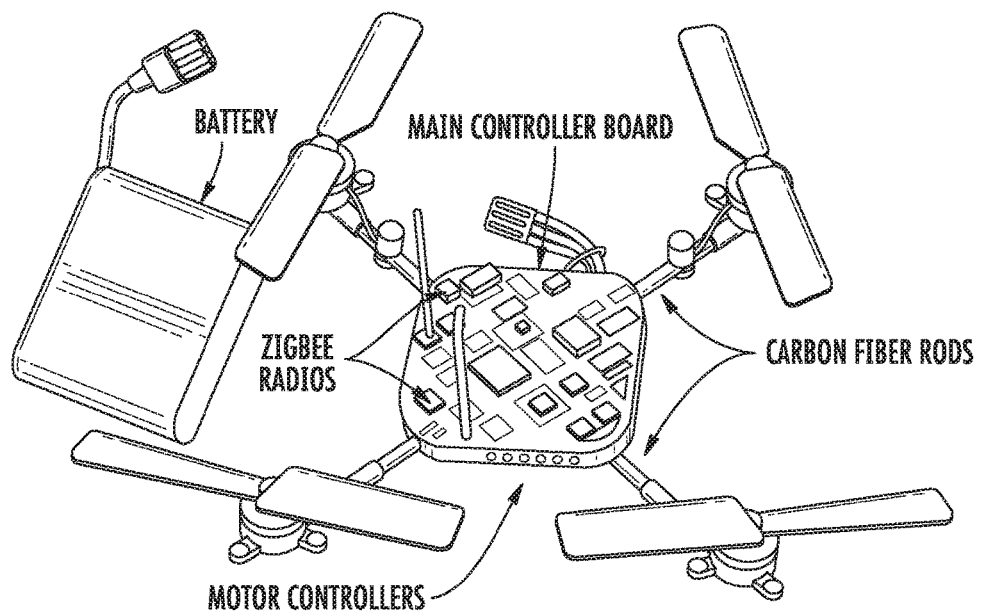
FIG. 2 illustrates an exemplary embodiment of a micro quadrotor.

An exemplary embodiment of a quadrotor in accordance with the invention is shown in FIG. 2. Its booms are made of carbon fiber rods that are sandwiched between a custom motor controller board on the bottom and the main controller board on the top. To produce lift, the vehicle uses four fixed-pitch propellers with diameters of 8 cm. The vehicle propeller-tip-to-propeller-tip distance is 21 cm and its weight without a battery is 50 grams. The hover time is approximately 11 minutes with a 2-cell 400 mAh Li—Po battery that weighs 23 grams.

Despite its small size, the vehicle of FIG. 2 contains a full suite of onboard sensors. An ARM Cortex-M3 processor, running at 72 MHz, serves as the main processor. The vehicle contains a 3-axis magnetometer, a 3-axis accelerometer, a 2-axis 2000 deg/sec rate gyro for the roll and pitch axes, and a single axis 500 deg/sec rate gyro for the yaw axis. The vehicle also contains a barometer that can be used to sense a change in altitude. For communication, the vehicle contains two Zigbee transceivers that can operate at either 900 MHz or 2.4 GHz.

A Vicon motion capture system is used to sense the position of each vehicle at 100 Hz. This data is streamed over a gigabit Ethernet network to a desktop base station. High-level control and planning is done in MATLAB on the base station, which sends commands to each quadrotor at 100 Hz. The software for controlling a large team of quadrotors is described below with respect to FIG. 7. Low-level estimation and control loops run on the onboard microprocessor at a rate of 600 Hz.

Each quadrotor has two independent radio transceivers, operating at 900 MHz and 2.4 GHz. The base station sends, via custom radio modules, the desired commands, containing orientation, thrust, angular rates and attitude controller gains to the individual quadrotors. The onboard rate gyros and accelerometer are used to estimate the orientation and angular velocity of the craft. The main microprocessor runs the attitude controller below and sends the desired propeller speeds to each of the four motor controllers at full rate (600 Hz).

Figure 3:
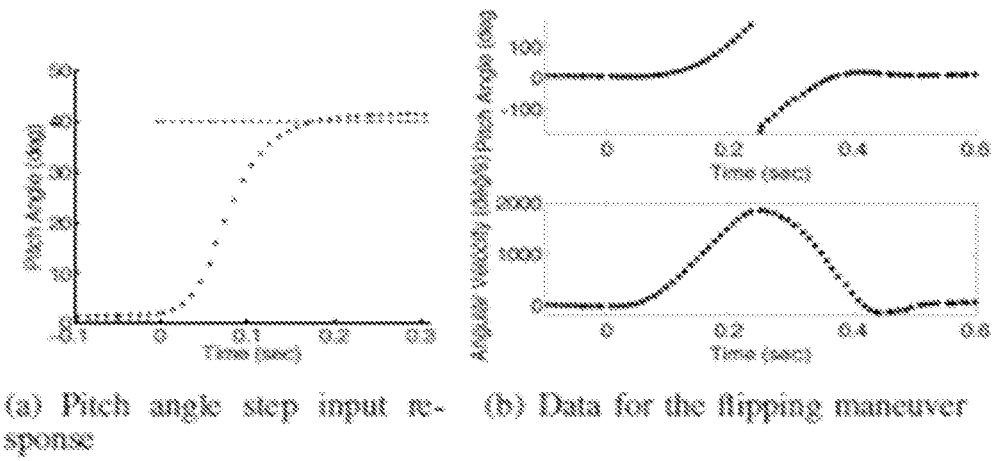
FIG. 3 illustrates altitude controller performance data, where (a) shows pitch angle step input response and (b) shows data for the flipping maneuver.
Figure 4:
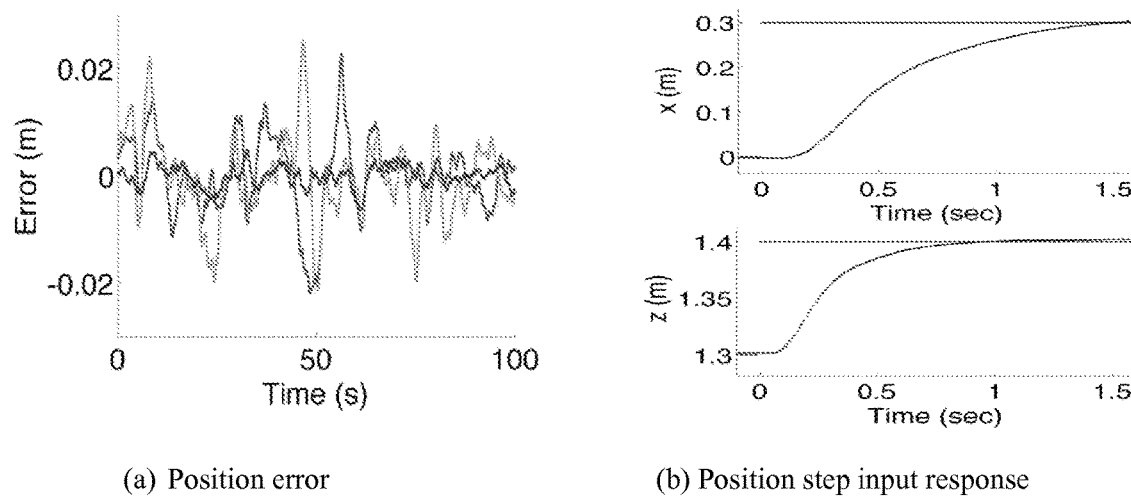
FIG. 4 (a) illustrates (a) x, y, z errors while hovering and (b) the step input response for the position controller in x (top) and z (bottom).

Some performance data for the onboard attitude controller is illustrated in FIG. 3. The small moments of inertia of the vehicle enable the vehicle to create large angular accelerations. As shown in FIG. 3(a), the attitude control is designed to be approximately critically damped with a settling time of less than 0.2 seconds. Note that this is twice as fast as the settling time for the attitude controller for the AscTec Hummingbird. Data for a flipping maneuver is presented FIG. 3(b). Here the vehicle completes a complete flip about its y axis in about 0.4 seconds and reaches a maximum angular velocity of 1850 deg/sec.

The position controller described below uses the roll and pitch angles to control the x and y position of the vehicle. For this reason, a stiff attitude controller is a required for stiff position control. Response to step inputs in the lateral and vertical directions are shown in FIG. 4(b). For the hovering performance data shown in FIG. 4(a), the standard deviations of the error for x and y are about 0.75 cm and about 0.2 cm for z.

Dynamics and Control

Figure 5:
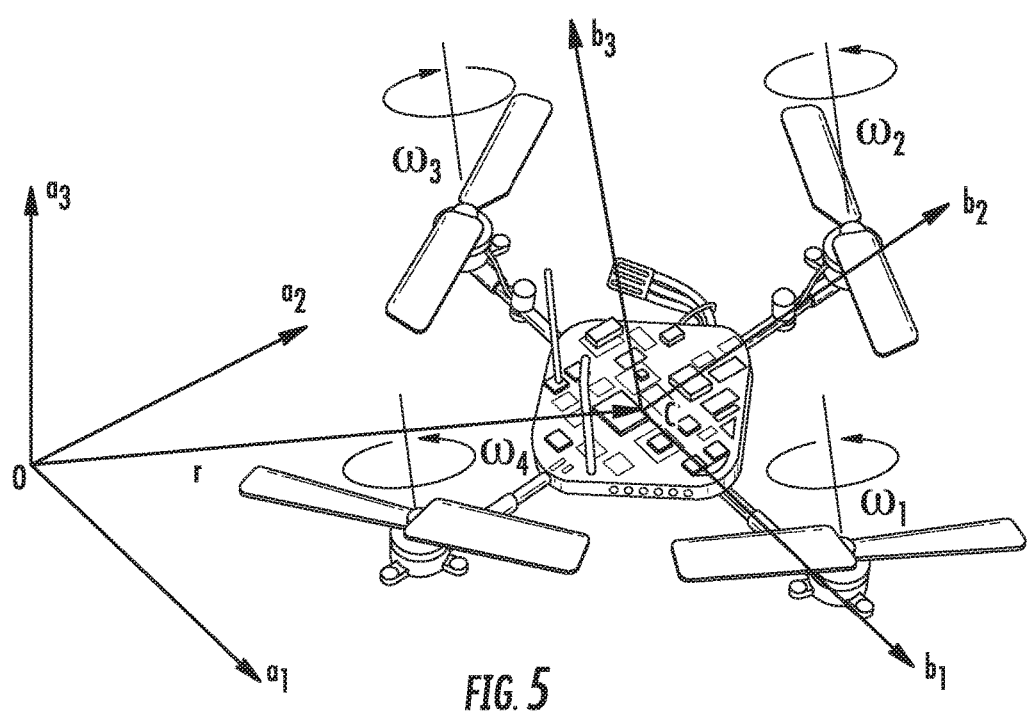
FIG. 5 illustrates the reference frames and propeller numbering convention.

The dynamic model and control for the micro quadrotor is based on the approach in the inventors' previous work. As shown in FIG. 5, the inventors consider a body-fixed frame B aligned with the principal axes of the quadrotor (unit vectors bi) and an inertial frame A with unit vectors ai. B is described in A by a position vector r to the center of mass C and a rotation matrix R. In order to avoid singularities associated with parameterization, the inventors use the full rotation matrix to describe orientations. The angular velocity of the quadrotor in the body frame, $\omega$, is given by $\hat{\omega} = R^T \dot{R}$, where ^ denotes the skew-symmetric matrix form of the vector.

As shown in FIG. 5, the four rotors are numbered 1-4, with odd numbered rotors having a pitch that is opposite to the even numbered rotors. The angular speed of the rotor is $\omega_i$. The resulting lift, $F_i$, and the reaction moment, $M_i$, are given by:

$$F_i = k_F \omega_i^2, \quad M_i = k_M \omega_i^2$$

where the constants $k_F$ and $k_M$ are empirically determined. For the micro quadrotor, the motor dynamics have a time constant less than 10 msec and are much faster than the time scale of rigid body dynamics and aerodynamics. Thus, the inventors neglect the dynamics and assume $F_i$ and $M_i$ can be instantaneously changed. Therefore, the control input to the system, u, consists of the net thrust in the b3 direction, $u_1 = \sum_{i=1}^{4} F_i$, and the moments in B, $[u_2, u_3, u_4]^T$, given by:

$$u = \begin{bmatrix} k_F & k_F & k_F & k_F \\ 0 & k_F L & 0 & -k_F L \\ -k_F L & 0 & k_F L & 0 \\ k_M & -k_M & k_M & -k_M \end{bmatrix} \begin{bmatrix} \omega_1^2 \\ \omega_2^2 \\ \omega_3^2 \\ \omega_4^2 \end{bmatrix}, \quad (1)$$

where L is the distance from the axis of rotation of the propellers to the center of the quadrotor. The Newton-Euler equations of motion are given by:

$$m\ddot{r} = -mga_3 + u_1 b_3 \quad (2)$$

$$\dot{\omega} = \mathcal{I}^{-1}\left[-\omega \times \mathcal{I}\omega + \begin{bmatrix} u_2 \\ u_3 \\ u_4 \end{bmatrix}\right] \quad (3)$$

where $\mathcal{I}$ is the moment of inertia matrix along $b_i$.

The inventors specify the desired trajectory using a time-parameterized position vector and yaw angle. Given a trajectory, $\sigma(t)$: $[0, t_f] \to \mathbb{R}^3 \times SO(2)$, the controller derives the input $u_1$ based on position and velocity errors:

$$u_1 = (-K_p e_p - K_v e_v + mga_3) \cdot b_3 \quad (4)$$

where $e_p = r - r_T$ and $e_v = \dot{r} - \dot{r}_T$. The other three inputs are determined by computing the desired rotation matrix. The inventors want to align the thrust vector $u_1 b_3$ with $(-K_p e_p - K_v e_v + mga_3)$ in equation (4). The inventors also want the yaw angle to follow the specified yaw $T(t)$. From these two pieces of information the inventors can compute $R_{des}$ and the error in rotation according to:

$$e_R = \tfrac{1}{2}(R_{des}^T R - R^T R_{des})^v$$

where $^v$ represents the vee map which takes elements of so(3) to $\mathbb{R}^3$. The desired angular velocity is computed by differentiating the expression for R and the desired moments can be expressed as a function of the orientation error, $e_R$, and the angular velocity error, $e_\omega$:

$$[u_2, u_3, u_4]^T = -K_R e_R - K_\omega e_\omega, \quad (5)$$

where $K_R$ and $K_\omega$ are diagonal gain matrices. Finally, the inventors compute the desired rotor speeds to achieve the desired u by inverting equation (1).

Control and Planning for Groups

The primary thrust of the invention is the coordination of a large team of quadrotors. To manage the complexity that results from growth of the state space dimensionality and to limit the combinatorial explosion arising from interactions between labeled vehicles, the inventors consider a team architecture in which the team is organized into labeled groups, each with labeled vehicles. Formally, the inventors can define a group of agents as a collection of agents which work simultaneously to complete a single task. Two or more groups act in a team to complete a task that requires completing multiple parallel subtasks. The inventors assume that vehicles within a group can communicate at high data rates with low latencies while the communication requirements for coordination across groups are much less stringent. Most importantly, vehicles within a group are labeled. The small group size allows the inventors to design controllers and planners that provide global guarantees on shapes, communication topology, and relative positions of individual, agile robots.

The approach here is in contrast to truly decentralized approaches that are necessary in swarms with hundreds and thousands of agents. While models of leaderless aggregation and swarming with aerial robots are discussed in the robotics community, here the challenge of enumerating labeled interactions between robots is circumvented by controlling such aggregate descriptors of formation as statistical distributions. These methods cannot provide guarantees on shape or topology. Reciprocal collision avoidance algorithms have the potential to navigate robots to goal destinations but no guarantees are available for transient performance and no proof of convergence is available.

On the other hand, the problem of designing decentralized controllers for trajectory tracking for three dimensional rigid structures is now fairly well understood, although few experimental results are available for aerial robots. The framework here allows the maintenance of such rigid structures in groups.

Flying in formation reduces the complexity of generating trajectories for a large team of vehicles to generating a trajectory for a single entity. If the controllers are well-designed, there is no need to explicitly incorporate collision avoidance between vehicles. The position error for quadrotor q at time t can be written as:

$$e_{pq}(t) = e_f(t) + e_{l_q}(t) \quad (6)$$

where $e_f(t)$ is the formation error rese describing the error of position of the group from the prescribed trajectory, and $e_{l_q}(t)$ is the local error of quadrotor q within the formation of the group. As the inventors will show below, the local error is typically quite small even for aggressive trajectories even though the formation error can be quite large.

A major disadvantage of formation flight is that the rigid formation can only fit through large gaps. This can be addressed by changing the shape of the formation of the team or dividing the team into smaller groups, allowing each group to negotiate the gap independently.

Another way to reduce the complexity of the trajectory generation problem is to require all vehicles to follow the same team trajectory but be separated by some time increment. Here the inventors let the trajectory for quadrotor q be defined as:

$$r_{Tq}(t) = r_{TT}(t + \Delta t_q) \quad (7)$$

where $r_{TT}$ is the team trajectory and $\Delta t_q$ is the time shift for quadrotor q from some common clock, t. If the team trajectory does not intersect or come within an unsafe distance of itself then vehicles simply need to follow each other at a safe time separation. Large numbers of vehicles can follow team trajectories that intersect themselves if the time separations, $t_q$, are chosen so that no two vehicles are at any of the intersection points at the same time. An experiment for an intersecting team trajectory is described below.

The inventors will now describe a method for generating smooth, safe trajectories through known 3-D environments satisfying specifications on intermediate waypoints for multiple vehicles. Integer constraints are used to enforce collision constraints with obstacles and other vehicles and also to optimally assign goal positions. This method draws from the extensive literature on mixed-integer linear programs (MILPs) and their application to trajectory planning from Schouwenaars et al. An optimization can be used to generate trajectories that smoothly transition through $n_w$ desired waypoints at specified times, $t_w$. The optimization program to solve this problem while minimizing the integral of the $k_r$th derivative of position squared for $n_q$ quadrotors is shown below.

$$\min \sum_{q=1}^{n_q} \int_{t_0}^{t_{n_w}} \left\| \frac{d^{k_r} r_{Tq}}{dt^{k_r}} \right\|^2 dt \quad (8)$$

s.t. $\quad r_{Tq}(t_w) = r_{wq}, \quad w = 0, \ldots, n_w; \forall q$ $\left. \dfrac{d^j x_{Tq}}{dt^j} \right|_{t=t_w} = 0$ or free, $\quad w = 0, n_w; j = 1, \ldots, k_r; \forall q$ $\left. \dfrac{d^j y_{Tq}}{dt^j} \right|_{t=t_w} = 0$ or free, $\quad w = 0, n_w; j = 1, \ldots, k_r; \forall q$ -continued $$\left.\frac{d^j z_{Tq}}{dt^j}\right|_{t=t_w} = 0 \text{ or free}, \quad w = 0, n_w; j = 1, \ldots, k_r; \forall q$$

Here $r_{Tq}=[x_{Tq}, y_{Tq}, z_{Tq}]$ represents the trajectory for quadrotor q and $r_{wq}$ represents the desired waypoints for quadrotor q. The inventors enforce continuity of the first $k_r$ derivatives of $r_{Tq}$ at $t_1, \ldots, t_{n_w-1}$. Writing the trajectories as piecewise polynomial functions allows the trajectories to be written as a quadratic program (or QP) in which the decision variables are the coefficients of the polynomials.

For quadrotors, since the inputs $u_2$ and $u_3$ appear as functions of the fourth derivatives of the positions, the inventors generate trajectories that minimize the integral of the square of the norm of the snap (the second derivative of acceleration, $k_r=4$). Large order polynomials are used to satisfy such additional trajectory constraints as obstacle avoidance that are not explicitly specified by intermediate waypoints.

For collision avoidance, the inventors model the quadrotors as a rectangular prism oriented with the world frame with side lengths $l_x$, $l_y$, and $l_z$. These lengths are large enough so that the quadrotor can roll, pitch, and yaw to any angle and stay within the prism. The inventors consider navigating this prism through an environment with $n_o$ convex obstacles. Each convex obstacle o can be represented by a convex region in configuration space with $n_f(o)$ faces. For each face f the condition that the quadrotor's desired position at time $t_k$, $r_{Tq}(t_k)$, be outside of obstacle o can be written as:

$$n_{of} \cdot r_{Tq}(t_k) \leq s_{of}, \tag{9}$$

where $n_{of}$ is the normal vector to face f of obstacle o in configuration space and $s_{of}$ is a scalar that determines the location of the plane. If equation (9) is satisfied for at least one of the faces, then the rectangular prism, and hence the quadrotor, is not in collision with the obstacle. The condition that quadrotor q does not collide with an obstacle o at time $t_k$ can be enforced with binary variables, $b_{qofk}$, as:

$$n_{of} \cdot r_{Tq}(t_k) \leq s_{of} + Mb_{qofk} \quad \forall f = 1, \ldots, n_f(o) \tag{10}$$

$$b_{qofk} = 0 \text{ or } 1 \quad \forall f = 1, \ldots, n_f(o)$$

$$\sum_{f=1}^{n_f(o)} b_{qofk} \leq n_f(o) - 1$$

where M is a large positive number. Note that if $b_{qofk}$ is 1 then the inequality for face f is always satisfied. The last inequality in equation (10) requires that the non-collision constraint be satisfied for at least one face of the obstacle which implies that the prism does not collide with the obstacle. The inventors can then introduce equation (10) into equation (8) for all $n_q$ quadrotors for all no obstacles at $n_k$ intermediate time steps between waypoints. The addition of the integer variables into the quadratic program causes this optimization problem to become a mixed-integer quadratic program (MIQP).

When transitioning between waypoints, quadrotors must stay a safe distance away from each other. The inventors enforce this constraint at $n_k$ intermediate time steps between waypoints which can be represented mathematically for quadrotors 1 and 2 by the following set of constraints:

$$\forall t_k: x_{T1}(t_k) - x_{T2}(t_k) \leq d_{x12}$$

or $x_{T2}(t_k) - x_{T1}(t_k) \leq d_{x21}$ or $y_{T1}(t_k) - y_{T2}(t_k) \leq d_{y12}$ or $y_{T2}(t_k) - y_{T1}(t_k) \leq d_{y21}$ \hfill (11)

Here the d terms represent safety distances. For axially symmetric vehicles $d_{x12}=d_{x21}=d_{y12}=d_{y21}$. Experimentally the inventors have found that quadrotors must avoid flying in each other's downwash because of a decrease in tracking performance and even instability in the worst cases. Therefore, the inventors do not allow vehicles to fly underneath each other here. Finally, the inventors incorporate constraints of equation (11) between all $n_q$ quadrotors in the same manner as in equation (10) into equation (8).

In many cases, one might not care that a certain quadrotor goes to a certain goal but rather that any vehicle does. Here the inventors describe a method for using integer constraints to find the optimal goal assignments for the vehicles. This results in a lower total cost compared to fixed-goal assignment and often a faster planning time because there are more degrees of freedom in the optimization problem. For each quadrotor q and goal g the inventors introduce the integer constraints:

$$x_{Tq}(t_{n_w}) \leq x_g + M\beta_{qg}$$

$$x_{Tq}(t_{n_w}) \geq x_g - M\beta_{qg}$$

$$y_{Tq}(t_{n_w}) \leq y_g + M\beta_{qg}$$

$$y_{Tq}(t_{n_w}) \geq y_g - M\beta_{qg}$$

$$z_{Tq}(t_{n_w}) \leq z_g + M\beta_{qg}$$

$$z_{Tq}(t_{n_w}) \geq z_g - M\beta_{qg} \tag{12}$$

Here $\beta_{qg}$ is a binary variable used to enforce the optimal goal assignment. If $\beta_{qg}$ is 0 then quadrotor q must be at goal g at $t_{nw}$. If $\beta_{qg}$ is 1 then these constraints are satisfied for any final position of quadrotor q. In order to guarantee that at least $n_g$ quadrotors reach the desired goals the inventors introduce the following constraint.

$$\sum_{q=1}^{n_q} \sum_{g=1}^{n_g} \beta_{qg} \leq n_g n_q - n_g \tag{13}$$

This approach can be easily adapted if there are more quadrotors than goals or vice versa.

The solving time of the MIQP grows exponentially with the number of binary variables that are introduced into the MIQP. Therefore, the direct use of this method does not scale well for large teams. Here the inventors present two relaxations that enable this approach to be used for large teams of vehicles.

Figure 6:
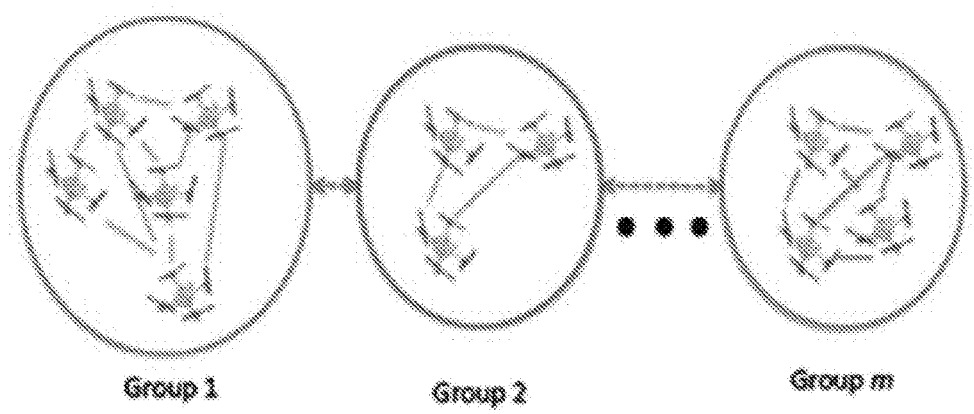
FIG. 6 illustrates the team of quadrotors organized into m groups.

As shown in FIG. 6, a large team of vehicles can be divided into smaller groups. The inventors can then use the MIQP method to generate trajectories to transition groups of vehicles to group goal locations. This reduces the complexity of the MIQP because instead of planning trajectories for all nq vehicles the inventors simply plan trajectories for the groups. Of course, the inventors are making a sacrifice here by not allowing the quadrotors to have the flexibility to move independently.

In many, cases the environment can be partitioned into nr convex sub-regions where each sub-region contains the same number of quadrotor start and goal positions. After partitioning the environment, the MIQP trajectory generation method can be used for the vehicles inside each region.

Here the inventors require quadrotors to stay inside their own regions using linear constraints on the positions of the vehicles. This approach guarantees collision free trajectories and allows quadrotors the flexibility to move independently. The inventors are gaining tractability at the expense of optimality since the true optimal solution might actually require quadrotors to cross region boundaries while this relaxed version does not. Also, it is possible that no feasible trajectories exist inside a sub-region but feasible trajectories do exist which cross region boundaries. Nonetheless, this approach works well in many scenarios and the inventors show its application to formation transitions for teams of 16 vehicles.

Model for Quadrotor Dynamics

Figure 13:
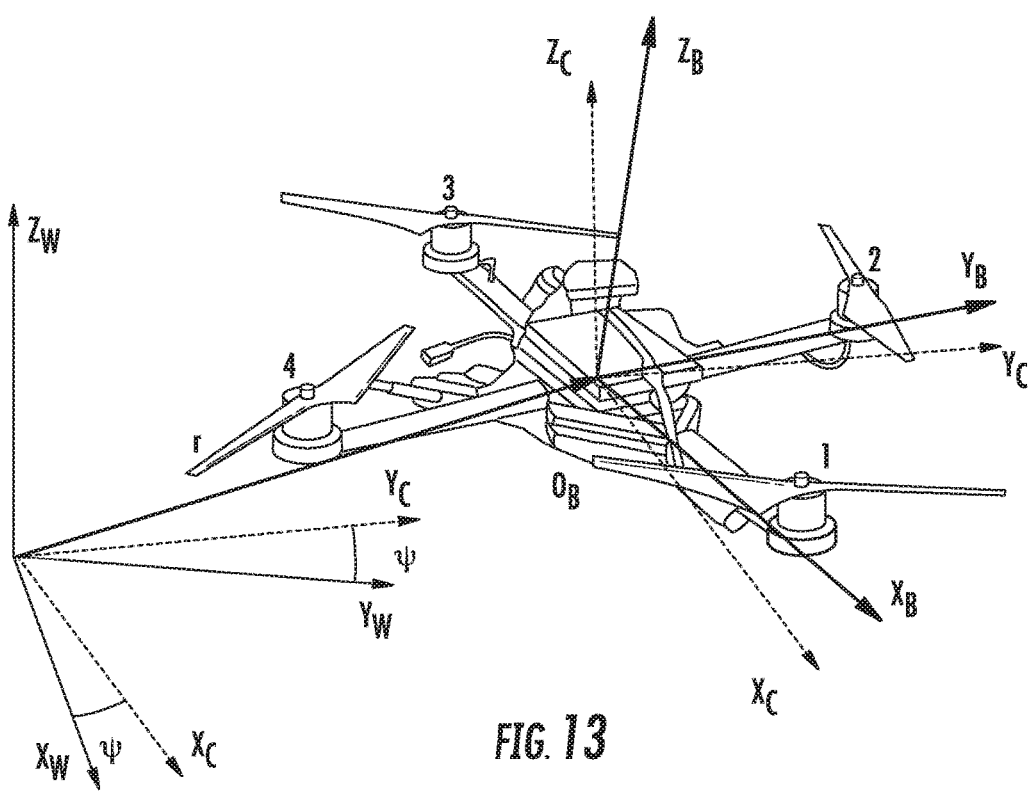
FIG. 13 illustrates the reference frames and propeller numbering convention.
Figure 14:
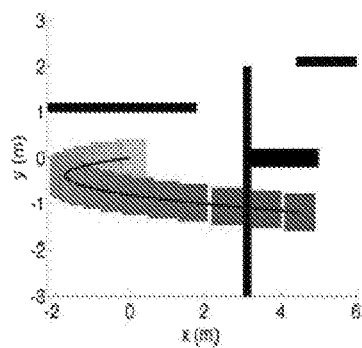
FIG. 14 shows trajectories for a single quadrotor navigating an environment with four obstacles where the obstacles are the solid boxes, the trajectory is shown as the solid line, the position of the quadrotor at the nk intermediate time steps for which collision checking is enforced is shown by the lighter shaded boxes which grow darker with passing time, and where (a) shows trajectory when time-step overlap constraints are not enforced and (b) shows when time-step overlap constraints are enforced.
Figure 14:
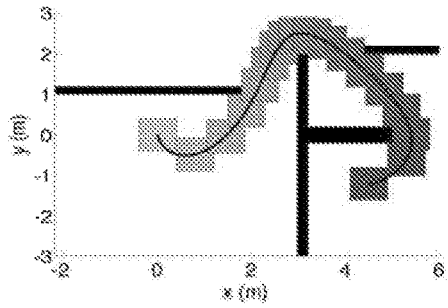

The coordinate systems including the world frame, W, and body frame, B, as well as the propeller numbering convention for the quadrotor are shown in FIG. 13. The inventors also use Z-X-Y. Euler angles to define the roll, pitch, and yaw angles ($\phi$, $\theta$, and $\psi$) as a local coordinate system. The rotation matrix from $\mathcal{B}$ to $\mathcal{W}$ is given by ${}^W R_B = {}^W R_C {}^C R_B$ where ${}^W R_C$ represents the yaw rotation to the intermediate frame $C$ and ${}^C R_B$ represents the effect of roll and pitch. The angular velocity of the robot is denoted by $\omega_{\mathcal{BW}}$ denoting the angular velocity of frame $\mathcal{B}$ in the frame $\mathcal{W}$, with components p, q, and r in the body frame. These values can be directly related to the derivatives of the roll, pitch, and yaw angles.

Each rotor has an angular speed $\omega_i$ and produces a force, $F_i$, and moment, $M_i$, according to:

$$F_i = k_F \omega_i^2, \quad M_i = k_M \omega_i^2.$$

In practice, the motor dynamics are relatively fast compared to the rigid body dynamics and the aerodynamics. Thus, for the controller development the inventors assume they can be instantaneously achieved. Therefore, the control input to the system can be written as u where u1 is the net body force u2; u3; u4 are the body moments which can be expressed according to the rotor speeds as:

$$u = \begin{bmatrix} k_F & k_F & k_F & k_F \\ 0 & k_F L & 0 & -k_F L \\ -k_F L & 0 & k_F L & 0 \\ k_M & -k_M & k_M & -k_M \end{bmatrix} \begin{bmatrix} \omega_1^2 \\ \omega_2^2 \\ \omega_3^2 \\ \omega_4^2 \end{bmatrix}, \quad (14)$$

where L is the distance from the axis of rotation of the propellers to the center of the quadrotor. The position vector of the center of mass in the world frame is denoted by r. The forces on the system are gravity, in the $-z_\mathcal{W}$ direction, and the sum of the forces from each of the rotors, u1, in the z $\mathcal{B}$ direction. Newton's equations of motion governing the acceleration of the center of mass are $$m\ddot{r} = -mg z_W + u_1 z_B. \quad (15)$$

The angular acceleration determined by the Euler equations is:

$$\dot{\omega}_{\mathcal{BW}} = \mathcal{I}^{-1}\left[-\omega_{\mathcal{BW}} \times \mathcal{I}\omega_{\mathcal{BW}} + \begin{bmatrix} u_2 \\ u_3 \\ u_4 \end{bmatrix}\right], \quad (16)$$

where $\mathcal{I}$ is the moment of inertia matrix referenced to the center of mass along the $x_B$-$y_B$-$z_B$ axes. The state of the system is given by the position and velocity of the center of mass and the orientation (locally parameterized by Euler angles) and the angular velocity:

$$x = [x,y,z,\phi,\theta,\psi,\dot{x},\dot{y},\dot{z},p,q,r]^T$$

or without the parameterization by the position and velocity of the center of mass and the rotation matrix ${}^W R_B$ and the angular velocity $\omega_{\mathcal{BW}}$.

Control

A controller for following trajectories can be defined as the position and yaw angle as a function of time, $r_T(t)$ and $\psi_T(t)$, respectively. The errors on position and velocity can be defined as:

$$e_p = r - r_T, \quad e_v = \dot{r} - \dot{r}_T.$$

Next the inventors compute the desired force vector for the controller and the desired body frame z axis:

$$F_{des} = -K_p e_p - K_v e_v + mg z_W + m\ddot{r}_T,$$

where $K_p$ and $K_v$ are positive definite gain matrices. Note that here the inventors assume $\|F_{des}\| \neq 0$. Next the inventors project the desired force vector onto the actual body frame z axis in order to compute the desired force for the quadrotor and the first control input:

$$u_1 = F_{des} \cdot z_B.$$

To determine the other three inputs, one must consider the rotation errors. First, it is observed that the desired $z_B$ direction is along the desired thrust vector:

$$z_{B,des} = \frac{F_{des}}{\|F_{des}\|}.$$

From the desired acceleration and a chosen yaw angle the total desired orientation can be found. The orientation error is a function of the desired rotation matrix, $R_{des}$, and actual rotation matrix, ${}^W R_B$:

$$e_R = \tfrac{1}{2}(R_{des}^T {}^W R_B - {}^W R_B^T R_{des})^v$$

where $^v$ represents the vee map which takes elements of so(3) to $\mathbb{R}^3$. Note that the difference in Euler angles can be used as an approximation to this metric. The angular velocity error is simply the difference between the actual and desired angular velocity in body frame coordinates:

$$e_\omega = {}^B[\omega_{\mathcal{BW}}] - {}^B[\omega_{\mathcal{BW},T}].$$

Now the desired moments and the three remaining inputs are computed as follows:

$$[u_2,u_3,u_4]^T = -K_R e_R - K_\omega e_\omega, \quad (5)$$

(17)

where $K_R$ and $K_\omega$ are diagonal gain matrices. This allows unique gains to be used for roll, pitch, and yaw angle tracking. Finally, the inventors compute the desired rotor speeds to achieve the desired u by inverting equation (14).

Single Quadrotor Trajectory Generation

In this section, the inventors first describe the basic quadrotor trajectory generation method using Legendre polynomial functions incorporating obstacles into the formulation. Specifically, the inventors solve the problem of generating smooth, safe trajectories through known 3-D environments satisfying specifications on intermediate waypoints.

Consider the problem of navigating a vehicle through nw waypoints at specified times. A trivial trajectory that satisfies these constraints is one that interpolates between waypoints using straight lines. However, this trajectory is inefficient because it has infinite curvature at the waypoints which requires the quadrotor to come to a stop at each waypoint. The method described here generates an optimal trajectory that smoothly transitions through the waypoints at the given times. The optimization program to solve this problem, while minimizing the integral of the $k_r$th derivative of position squared, is shown below.

$$\min \int_{t_0}^{t_{n_w}} \left\| \frac{d^{k_r} r_T}{dt^{k_r}} \right\|^2 dt \quad (18)$$

$$\text{s.t. } r_T(t_w) = r_w, w = 0, \ldots, n_w$$

$$\left. \frac{d^j x_T}{dt^j} \right|_{t=t_w} = 0 \text{ or free, } w = |0, n_w; j = 1, \ldots, k_r$$

$$\left. \frac{d^j y_T}{dt^j} \right|_{t=t_w} = 0 \text{ or free, } w = 0, n_w; j = 1, \ldots, k_r$$

$$\left. \frac{d^j z_T}{dt^j} \right|_{t=t_w} = 0 \text{ or free, } w = 0, n_w; j = 1, \ldots, k_r$$

Here $r_T = [x_T, y_T, z_T]^T$ and $r_i = [x_i, y_i, z_i]^T$. The inventors enforce continuity of the first $k_r$ derivatives of $r_T$ at $t_1, \ldots, t_{n_w-1}$. Next the inventors write the trajectories as piecewise polynomial functions of order np over nw time intervals using polynomial basis functions $P_{pw}(t)$:

$$r_T(t) = \begin{cases} \sum_{p=0}^{n_p} r_{Tp1} P_{p1}(t) & t_0 \leq t < t_1 \\ \sum_{p=0}^{n_p} r_{Tp2} P_{p2}(t) & t_1 \leq t < t_2 \\ \vdots \\ \sum_{p=0}^{n_p} r_{Tpn_w} P_{pn_w}(t) & t_{n_w-1} \leq t \leq t_{n_w} \end{cases} \quad (19)$$

This allows the inventors to formulate the problem as a quadratic program (or QP) by writing the constants $r_{Tpw} = [x_{Tpw}, y_{Tpw}, z_{Tpw}]^T$ as a $3n_w n_p \times 1$ decision variable vector c:

$$\min c^T H c + f^T c \quad (20)$$

$$\text{s.t. } Ac \leq b$$

$$A_{eq} c = b_{eq}$$

In the system described herein, since the inputs $u_2$ and $u_3$ appear as functions of the fourth derivatives of the positions, the inventors generate trajectories that minimize the integral of the square of the norm of the snap (the second derivative of acceleration, $k_r = 4$). The basis in equation (19) allows the inventors to go to higher order polynomials, which allows the inventors to satisfy such additional trajectory constraints as obstacle avoidance that are not explicitly specified by intermediate waypoints.

Although this problem formulation is valid for any set of spanning polynomial basis functions, $P_{pw}(t)$, the choice does affect the numerical stability of the solver. A poor choice of basis functions can cause the matrix H in equation (20) to be ill-conditioned for large order polynomials. In order to diagonalize H and ensure that it is a well-conditioned matrix, the inventors use Legendre polynomials as basis functions for the $k_r$th derivatives of the positions here. Legendre polynomials are a spanning set of orthogonal polynomials on the interval from −1 to 1:

$$\int_{-1}^{1} \lambda_m(\tau) \lambda_n(\tau) d\tau = \frac{2}{2n+1} \delta_{nm}$$

where $\delta_{nm}$ is the Kronecker delta and is the non-dimensionalized time. The inventors then shift these Legendre polynomials to be orthogonal on the interval from $t_{w-1}$ to $t_w$ which the inventors call $\lambda_{pw}(t)$. The inventors use these shifted Legendre polynomials to represent the $k_r$th derivatives of the first $n_p - k_r$ basis functions for the position function, $P_{pw}(t)$. These first $n_p - k_r$ polynomials must satisfy:

$$\frac{d^{k_r} P_{pw}(t)}{dt^{k_r}} = \lambda_{pw}(t)$$

$$p = 1, \ldots, (n_p - k_r)$$

The inventors define the last $k_r$ define polynomial basis function as $P_{pw}(t) = (t - t_w - 1)p = (n_p - k_r + 1), \ldots, n$. Note these last $k_r$ polynomial basis functions have no effect on the cost function because their $k_r$th derivatives are zero. In this work the inventors take $k_r = 4$ and $n_p$ is generally between 9 and 15.

For collision avoidance, the inventors model the quadrotor as a rectangular prism oriented with the world frame with side lengths $l_x$, $l_y$, and $l_z$. These lengths are large enough so that the quadrotor can roll, pitch, and yaw to any angle and stay within the prism. The inventors consider navigating this prism through an environment with no convex obstacles. Each convex obstacle o can be represented by a convex region in configuration space with $n_f(o)$ faces. For each face f the condition that the quadrotor's desired position at time $t_k$, $r_T(t_k)$, be outside of obstacle o can be written as $$n_{of} \cdot r_T(t_k) \leq s_{of}, \quad (21)$$

where $n_{of}$ is the normal vector to face f of obstacle o in configuration space and sof is a scalar that determines the location of the plane. If equation (21) is satisfied for at least one of the faces, then the rectangular prism, and hence the quadrotor, is not in collision with the obstacle. The condition that the prism does not collide with an obstacle o at time tk can be enforced with binary variables, $b_{ofk}$, as:

$$n_{of} \cdot r_T(t_k) \leq s_{of} + M b_{ofk} \; \forall f = 1, \ldots, n_f(o) \quad (22)$$

$$b_{ofk} = 0 \text{ or } 1 \; \forall f = 1, \ldots, n_f(o)$$

$$\sum_{f=1}^{n_f(o)} b_{ofk} \leq n_f(o) - 1$$

where M is a large positive number. Note that if $b_{ofk}$ is 1, then the inequality for face f is always satisfied. The last inequality in equation (22) requires that the non-collision constraint be satisfied for at least one face of the obstacle, which implies that the prism does not collide with the obstacle. The inventors can then introduce equation (22) into (20) for all obstacles at $n_k$ intermediate time steps between waypoints. The addition of the integer variables into the quadratic program causes this optimization problem to become a mixed-integer quadratic program (MIQP).

This formulation is valid for any convex obstacle but the inventors only consider rectangular obstacles herein for simplicity. This formulation is easily extended to moving obstacles by simply replacing $n_{of}$ with $n_{of}(t_k)$ and $s_{of}$ with $s_{of}(t_k)$ in equation (22). Non-convex obstacles can also be efficiently modeled in this framework.

Equation (20) represents a continuous time optimization. The inventors discretize time and write the collision constraints in equation (22) for $n_k$ time points. However, collision constraints at $n_k$ discrete times does not guarantee that the trajectory will be collision-free between the time steps. For a thin obstacle, the optimal trajectory may cause the quadrotor to travel quickly through the obstacle such that the collision constraints are satisfied just before passing through the obstacle and just after as shown in FIG. 14(a). This problem can be fixed by requiring that the rectangular prism for which collision checking is enforced at time step k has a finite intersection with the corresponding prism for time step k+1:

$$|x_T(t_k)-x_T(t_k+1)| \le l_x \forall k=0,\ldots,n_k$$

$$|y_T(t_k)-y_T(t_k+1)| \le l_y \forall k=0,\ldots,n_k$$

$$|z_T(t_k)-z_T(t_k+1)| \le l_z \forall k=0,\ldots,n_k$$

These additional time-step overlap constraints prevent the trajectory from passing through obstacles as shown in FIG. 14(b). Enforcing time-step overlap is equivalent to enforcing an average velocity constraint between time steps. Of course, enough time steps must be used so that a solution is feasible. The trajectory may still cut corners due to the time discretization. The inventors address this by appropriately inflating the size of the obstacles and prisms for which collision checking is enforced. After the trajectory is found, the inventors perform a collision check to ensure that the actual quadrotor shape does not intersect with any of the obstacles over the entire trajectory.

We can exploit temporal scaling to tradeoff between safety and aggressiveness. If the inventors change the time to navigate the waypoints by a factor of (e.g., $\alpha=2$ allows the trajectory to be executed in twice as much time) the version of the original solution to the time-scaled problem is simply a time-scaled version of the original solution. Hence, the inventors do not need to resolve the MIQP. As $\alpha$ is increased the plan takes longer to execute and becomes safer. As $\alpha$ goes to infinity all the derivatives of position and yaw angle as well as the angular velocity go to zero which leads, in the limit, to $$u(t) \to [mg,0,0,0]^T,$$

in equation (16) and equation (17). By making large enough, the inventors can satisfy any motion plan generated for a quadrotor with the assumption of small pitch and roll. Conversely, as size is decreased, the trajectory takes less time to execute, the derivatives of position increase, and the trajectory becomes more aggressive leading to large excursions from the zero pitch and zero roll configuration.

Multiple Quadrotor Trajectory Generation

In this section, the inventors extend the method to include $n_q$ heterogeneous quadrotors navigating in the same environment, often in close proximity, to designated goal positions, each with specified waypoints. This is done by solving a larger version of equation (20) where the decision variables are the trajectories coefficients of all $n_q$ quadrotors. For collision avoidance constraints, each quadrotor can be a different size as specified by unique values of $l_x$, $l_y$, $l_z$. The inventors also consider heterogeneity terms with relative cost weighting and inter-quadrotor collision avoidance.

A team of quadrotors navigating independently must resolve conflicts that lead to collisions and "share" the three-dimensional space. Thus, they must modify their individual trajectories to navigate an environment and avoid each other. If all quadrotors are of the same type then it makes sense for them to share the burden of conflict resolution equally. However, for a team of heterogeneous vehicles it may be desirable to allow some quadrotors to follow relatively easier trajectories than others, or to prioritize quadrotors based on user preferences. This can be accomplished by weighting their costs accordingly. If quadrotor q has relative cost $\mu_q$ then the quadratic cost matrix, $H_m$, in the multi-quadrotor version of equation (20) can be written:

$$H_m = \text{diag}(\mu_1 H_1, \mu_2 H_2, \ldots, \mu_{n_q} H_{n_q}) \quad (24)$$

Applying a larger weighting factor to a quadrotor lets it take a more direct path between its start and goal. Applying a smaller weighting factor forces a quadrotor to modify its trajectory to yield to other quadrotors with larger weighting factors. This ability is particularly valuable for a team of both agile and slow quadrotors as a trajectory for a slow, large quadrotor can be assigned a higher cost than the same trajectory for a smaller and more agile quadrotor. A large quadrotor requires better tracking accuracy than a small quadrotor to fly through the same narrow gap so it is also useful to assign higher costs for larger quadrotors in those situations.

Quadrotors must stay a safe distance away from each other. The inventors enforce this constraint at $n_k$ intermediate time steps between waypoints which can be represented mathematically for quadrotors 1 and 2 by the following set of constraints:

$$\forall t_k: x_{1T}(t_k)-x_{2T}(t_k) \le d_{x12}$$

$$\text{or } x_{2T}(t_k)-x_{1T}(t_k) \le d_{x21}$$

$$\text{or } y_{1T}(t_k)-y_{2T}(t_k) \le d_{x12}$$

$$\text{or } y_{2T}(t_k)-y_{1T}(t_k) \le d_{x21}$$

$$\text{or } z_{1T}(t_k)-z_{2T}(t_k) \le d_{x12}$$

$$\text{or } z_{2T}(t_k)-z_{1T}(t_k) \le d_{x21} \quad (25)$$

Here the d terms represent safety distances. For axially symmetric vehicles $d_{x12}=d_{x21}=d_{y12}=d_{y21}$. Experimentally, the inventors have found that quadrotors must avoid flying in the downwash of similar-sized or larger quadrotors because of a decrease in tracking performance and even instability in the worst cases. Larger quadrotors, however, can fly underneath smaller quadrotors. The inventors have demonstrated that a larger quadrotor can even fly stably enough under a small quadrotor to serve as an aerial landing platform. Therefore, if quadrotor 1 and 2 are of the same type, then $d_{z12}=d_{z21}$. However, if quadrotor 1 is much bigger than quadrotor 2, then quadrotor 2 must fly well below the larger quadrotor at some large distance $d_{z12}$ while quadrotor 1 can fly much closer underneath quadrotor 2 represented by the smaller distance $d_{z21}$. The exact values of these safety distances can be found experimentally by measuring the tracking performance for different separation distances between quadrotor types. Finally, the inventors incorporate constraints of equation (25) between all $n_q$ quadrotors in the same manner as in equation (22) into the multi-quadrotor version of equation (20).

Here the inventors analyze the complexity of the MIQP generated by this formulation for a three-dimensional navigation problem formed by equations (20), (22), and (25). In this problem, the number of continuous variables, $n_c$, is at most:

$$n_c = 3 n_w n_p n_q. \quad (26)$$

Some continuous variables can be eliminated from the MIQP by removing the equality constraints. A strong factor that determines the computational time is the number of binary variables, $n_b$, that are introduced. The number of binary variables for a three-dimensional navigation problem is:

$$n_b = n_w n_k n_q \prod_{o=1}^{n_o} n_f(o) + n_w n_k \frac{n_q(n_q - 1)}{2} 6 \quad (27)$$

The first term in equation (27) accounts for the obstacle avoidance constraints and the second term represents inter-quadrotor safety distance enforcement. The inventors use a branch and bound solver to solve the MIQP. At a worst case there are $2^{n_b}$ leaves of the tree to explore. Therefore, this is not a method that scales well for large number of robots but it can generate optimal trajectories for small teams (up to 4 quadrotors herein) and a few obstacles. One advantage with this technique is that suboptimal, feasible solutions that guarantee safety and conflict resolution can be found very quickly (compare $T_1$ and $T_{opt}$ in Table below) if the available computational budget is low.

Experimental Results

Figure 7:
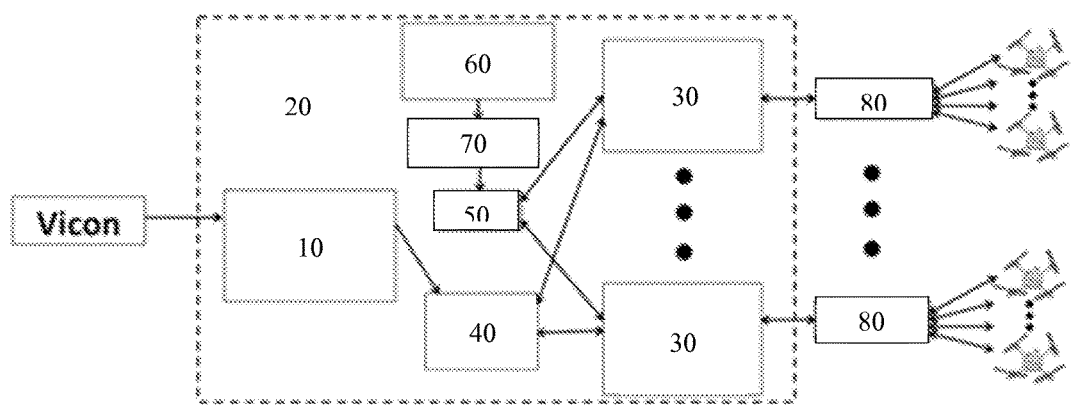
FIG. 7 shows the software infrastructure for the groups of quadrotors.

The architecture of the exemplary quadrotor is important for a very practical reason. For a large team of quadrotors, it is impossible to run a single loop that can receive all the Vicon data, compute the commands, and communicate with each quadrotor at a fast enough rate. As shown in FIG. 7, each group is controlled by a dedicated Vicon software node 10 on a desktop base station 20, running in an independent thread. The control nodes 30 receive vehicle pose data from Vicon node 10 via shared memory 40. The Vicon node 10 connects to the Vicon tracking system, receives marker positions for each subject, performs a 6D pose fit to the marker data, and additional processing for velocity estimation. Finally, the processed pose estimates are published to the shared memory 40 using the Boost C++ library. Shared memory 40 is the fastest method of inter-process communication, which ensures the lowest latency of the time-critical data.

The control nodes 30, implemented in Matlab, read the pose data directly from shared memory 40 and compute the commanded orientation and net thrusts for several quadrotors based on the controller described above. For non-time-critical data sharing, the inventors use Inter Process Communication (IPC) 50. For example, high-level user commands 60 such as desired vehicle positions are sent to a planner 70 that computes the trajectories for the vehicles that are sent to the Matlab control nodes 30 via IPC 50. IPC 50 provides flexible message passing and uses TCP/IP sockets to send data between processes.

Each Matlab control node is associated with a radio module containing a 900 MHz and 2.4 GHz Zigbee transceivers, which is used to communicate with all the vehicles in its group. The radio module 80 sends control commands to several vehicles, up to five in an exemplary embodiment. Each vehicle operates on a separate channel, and the radio module 80 hops between the frequencies for each quadrotor, sending out commands to each vehicle at 100 Hz. The radio modules 80 can also simultaneously receive high bandwidth feedback from the vehicles, making use of two independent transceivers.

Figure 8:
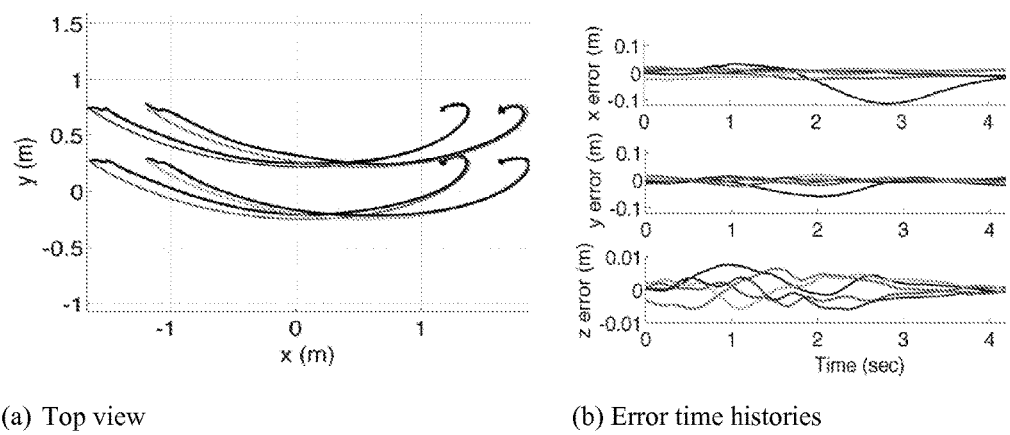
FIG. 8 illustrates the formation following for a 4 quadrotor trajectory, where (a) illustrates the desired trajectories for each of the four vehicles and the actual trajectories, and the formation errors are shown in (b) for each quadrotor.

In FIG. 8 the inventors present data for a team of four quadrotors following a trajectory as a formation. The group formation error is significantly larger than the local error. The local x and y errors are always less than 3 cm while the formation x error is as large as 11 cm. This data is representative of all formation trajectory following data because all vehicles are nominally gains. Therefore, even though the deviation from the desired trajectory may be large, the relative position error within the group is small.

Figure 9:
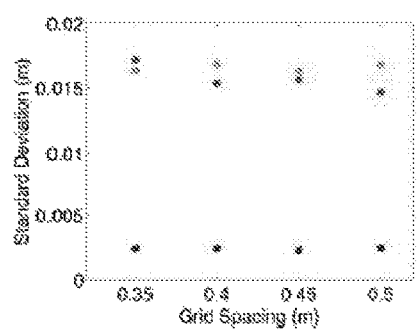
FIG. 9 illustrates at (a) the Average Standard Deviation for x, y, and z for 20 quadrotors in a grid formation, and (b) illustrates 16 quadrotors following a figure eight pattern.
Figure 9:
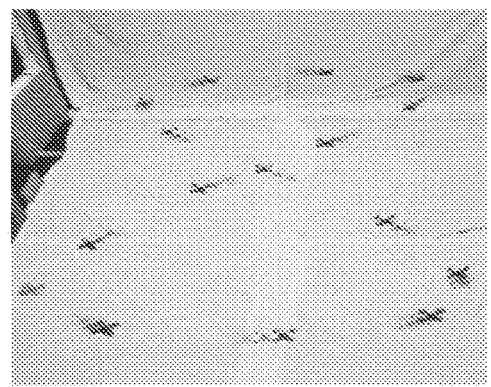

FIG. 9(*a*) illustrates average error data for 20 vehicles flying in the grid formation shown in FIG. 1. For this experiment, the vehicles were controlled to hover at a height of 1.3 meters for at least 30 seconds at several quadrotor-center-to-quadrotor-center grid spacing distances. The air disturbance created from the downwash of all 20 vehicles is significant and causes the tracking performance to be worse for any vehicle in this formation than for an individual vehicle in still air. However, as shown in FIG. 9(*a*), the separation distance did not have any effect on the hovering performance. Note that at 35 cm grid spacing the nominal distance between propeller tips is about 14 cm.

FIG. 9(*b*) illustrates a team of 16 vehicles following a cyclic figure eight pattern. The time to complete the entire cycle is $t_c$ and the vehicles are equally spaced in time along the trajectory at time increments of $t_c/16$. In order to guarantee collision-free trajectories at the intersection, vehicles spend $15/32$ $t_c$ in one loop of the trajectory and $17/32$ $t_c$ in the other. A trajectory that satisfies these timing constraints and has some specified velocity at the intersection point (with zero acceleration and jerk) is generated using the optimization-based method for a single vehicle.

Further, the inventors use a branch and bound solver to solve the MIQP trajectory generation problem. The solving time for the MIQP is an exponential function of the number of binary constraints and also the geometric complexity of the environment. The first solution is often delivered within seconds but finding the true optimal solution and a certificate optimality can take as long as 20 minutes on a 3.4 Ghz Corei7 Quad-Core desktop machine for the examples presented here.

Figure 10:
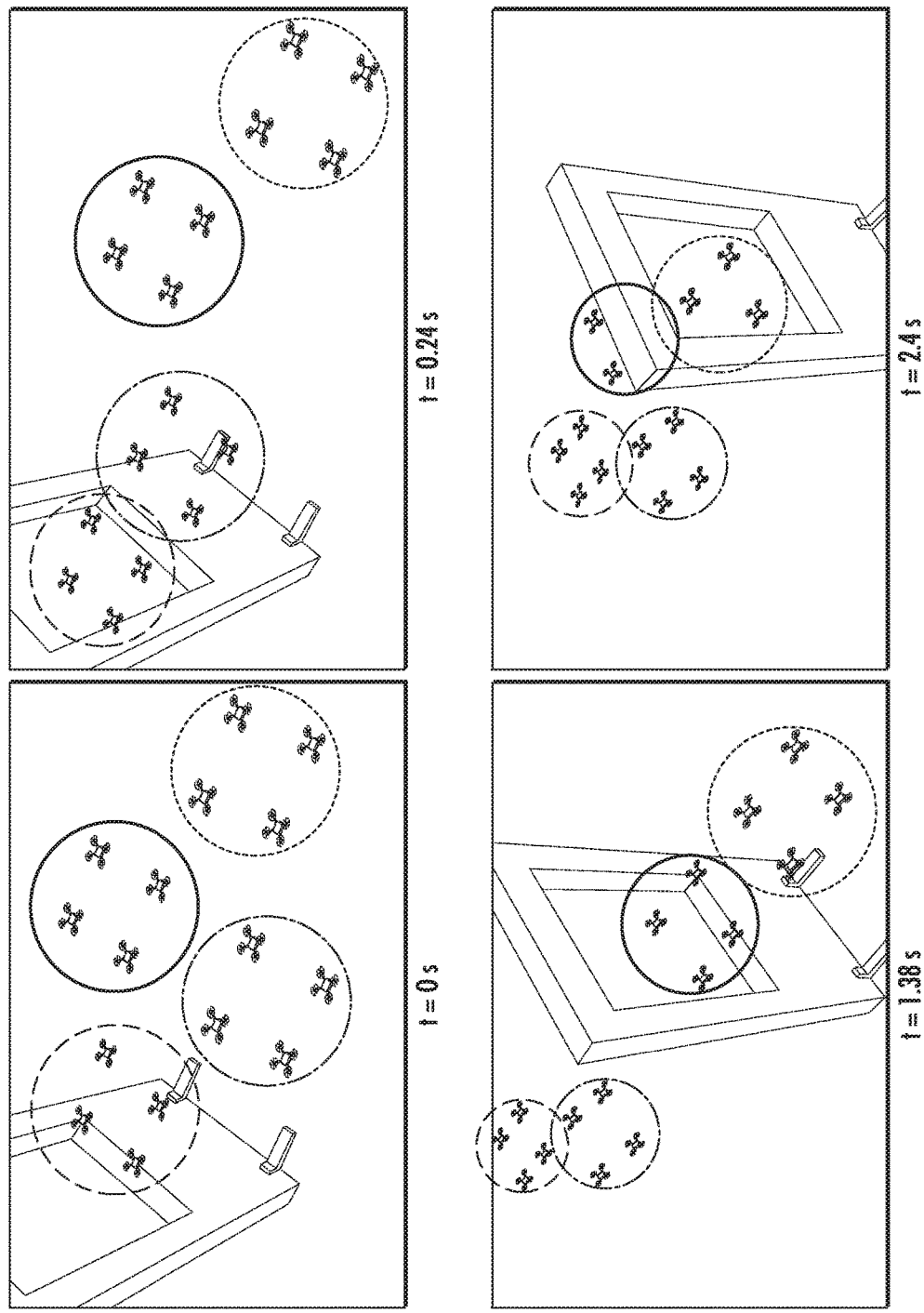
FIG. 10 illustrates four groups of four quadrotors flying through a window.

1) Planning for Groups within a Team:

FIG. 10 illustrates snapshots from an experiment for four groups of four quadrotors transitioning from one side of a gap to the other. Note that in this example the optimal goal assignment is performed at the group-level.

Figure 11:
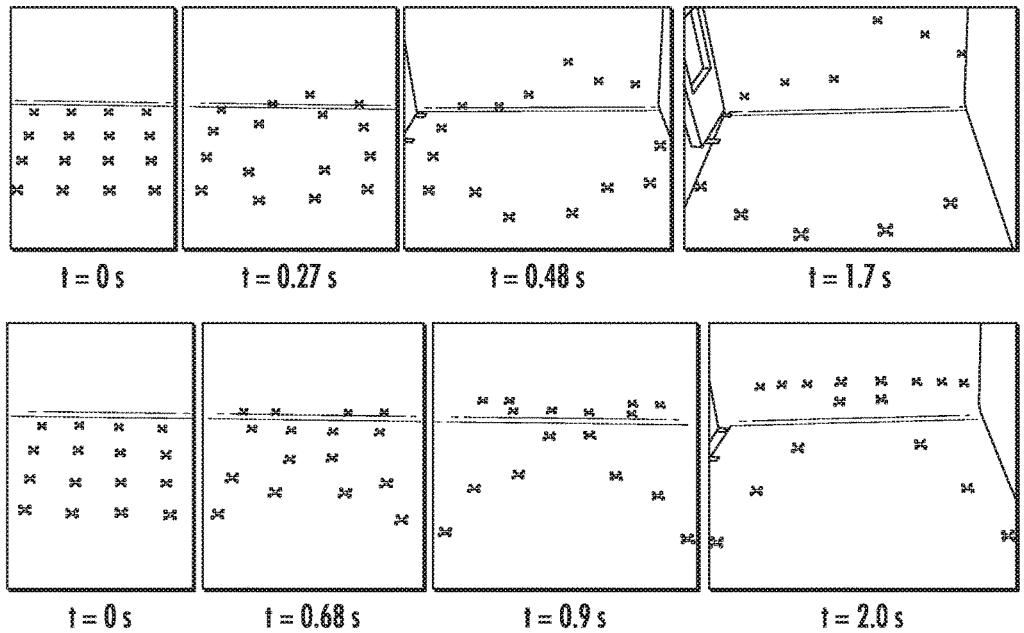
FIG. 11 illustrates a team of sixteen vehicles transitioning from a planar grid to a three-dimensional helix (top) and pyramid (bottom)

2) Planning for Sub-Regions:

FIG. 11 illustrates snapshots from an experiments with 16 vehicles transitioning from a planar grid to a three-dimensional helix and pyramid. Directly using the MIQP approach to generate trajectories for 16 vehicles is not practical. Therefore, in both experiments the space is divided into two regions and separate MIQPs with 8 vehicles each are used to generate trajectories for vehicles on the left and right sides of the formation. Note that, in general, the formations do not have to be symmetric but here the inventors exploit the symmetry and only solve a single MIQP for 8 vehicles for these examples. Optimal goal assignment is used so that the vehicles collectively choose their goals to minimize the total cost.

Figure 12:
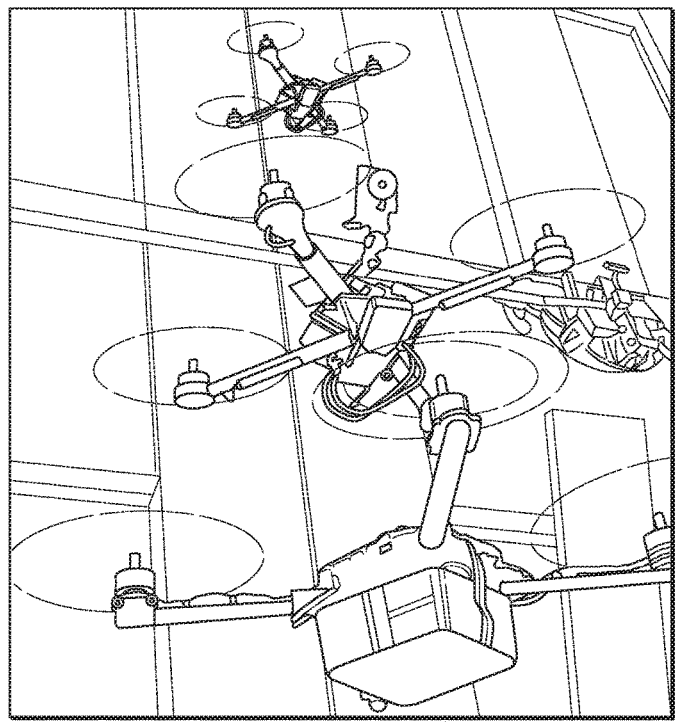
FIG. 12 illustrates the flight of a kQuad65 (top), the Asctec Hummingbird (middle), and the kQuad1000 (bottom) quadrotors.

The experiments presented here are conducted with Ascending Technologies Hummingbird quadrotors as well as the kQuad65 and kQuad1000 quadrotors developed in-house which weigh 457, 65, and 962 grams and have a blade tip to blade tip length of 55, 21, and 67 cm, respectively. Such quadrotors are illustrated in FIG. 12. The inventors use a Vicon motion capture system to estimate the position and velocity of the quadrotors and the onboard IMU to estimate the orientation and angular velocities. The software infrastructure is described in "*The grasp multiple micro uav testbed*," N Michael, D Mellinger, Q Lindsey, and V. Kumar, September, 2010.

In previous work of the inventors, the orientation error term was computed off-board the vehicle using the orientation as measured by the motion capture system. This off-board computation introduces a variable time delay in the control loop which is significant when using with multiple quadrotors. The time delay limits the performance of the attitude controller. The inventors choose to instead use a stiff on-board linearized attitude controller as in instead of the softer off-board nonlinear attitude controller. The inventors solve all problems with the MIQP solver in a CPLEX software package.

Figure 15:
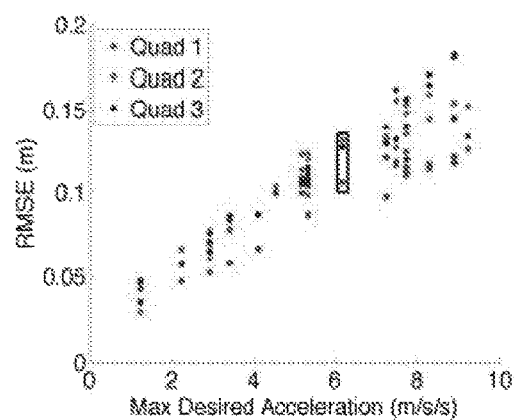
FIG. 15 illustrates at (a) RMSE for 30 trials at various speeds and (b)-(d) illustrate data for a single run (the boxed data in (a)) where the boxes represent the quadrotor positions at specified times during the experiments corresponding to the snapshots in FIG. 16 and the solid lines represent the actual quadrotor trajectories for this run while the dotted lines represent the desired trajectories.
Figure 15:
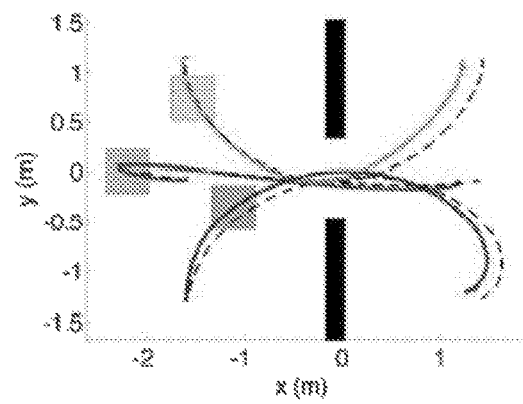
Figure 15:
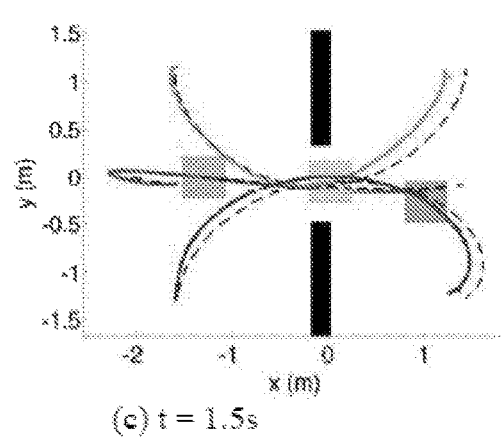
Figure 15:
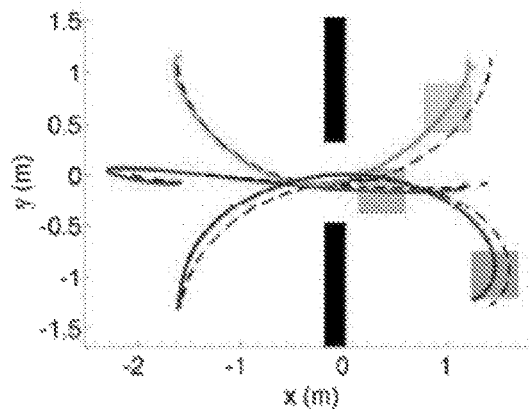
Figure 16:
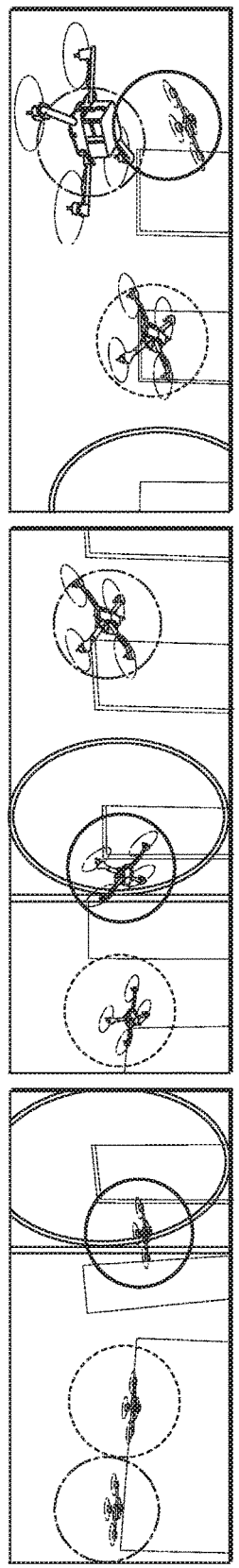
FIG. 16 illustrates snapshots of the three quadrotor experiment in which the hoop represents the gap.
Figure 17:
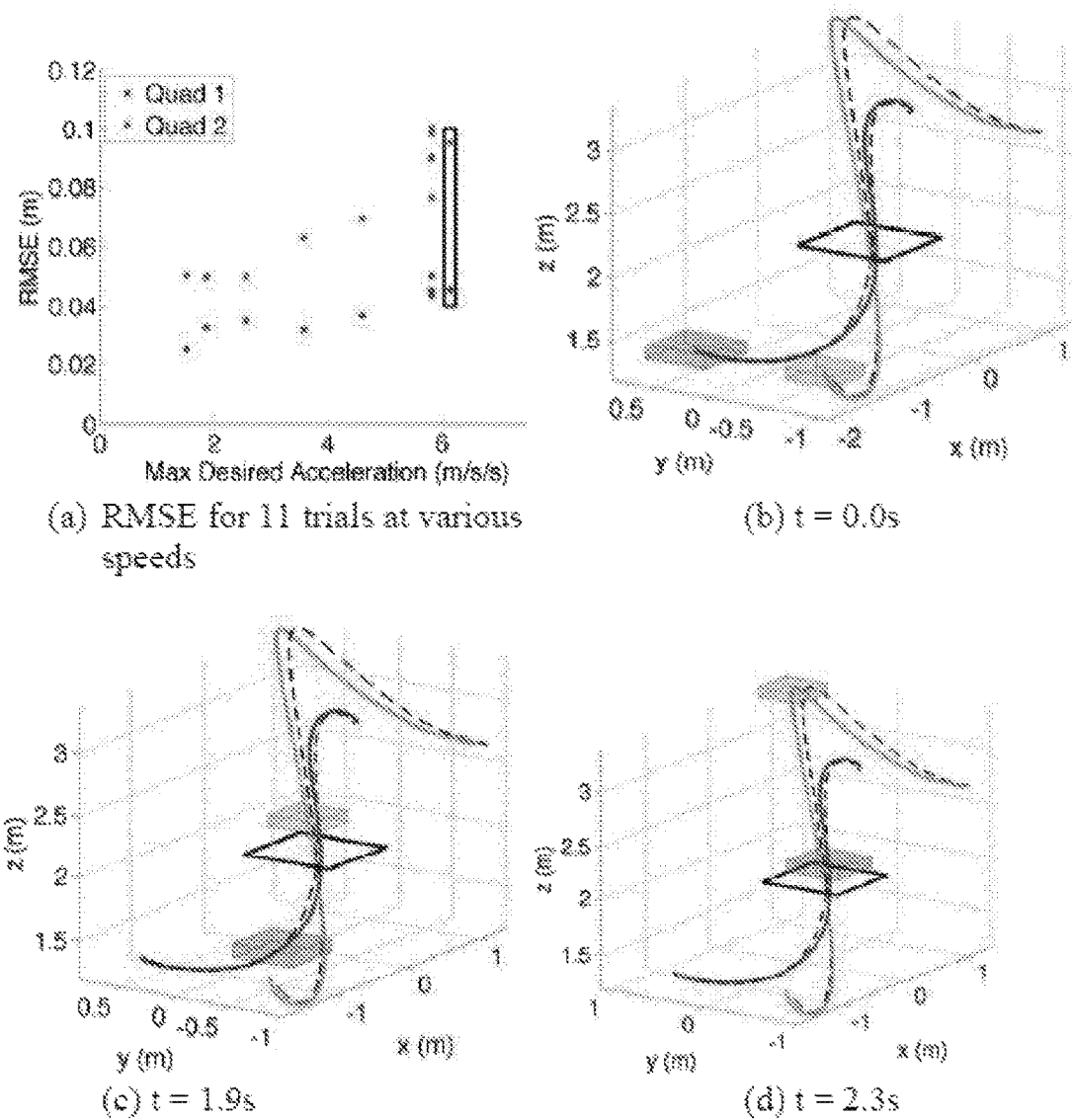
FIG. 17 illustrates at (a) RMSE for 11 trials at various speeds and (b)-(d) illustrate data for a single run (the boxed data in (a)) where the boxes represent the quadrotor positions at specified times during the experiment corresponding to the snapshots in FIG. 18 and the solid lines represent the actual quadrotor trajectories for this run while the dotted lines represent the desired trajectories.
Figure 18:
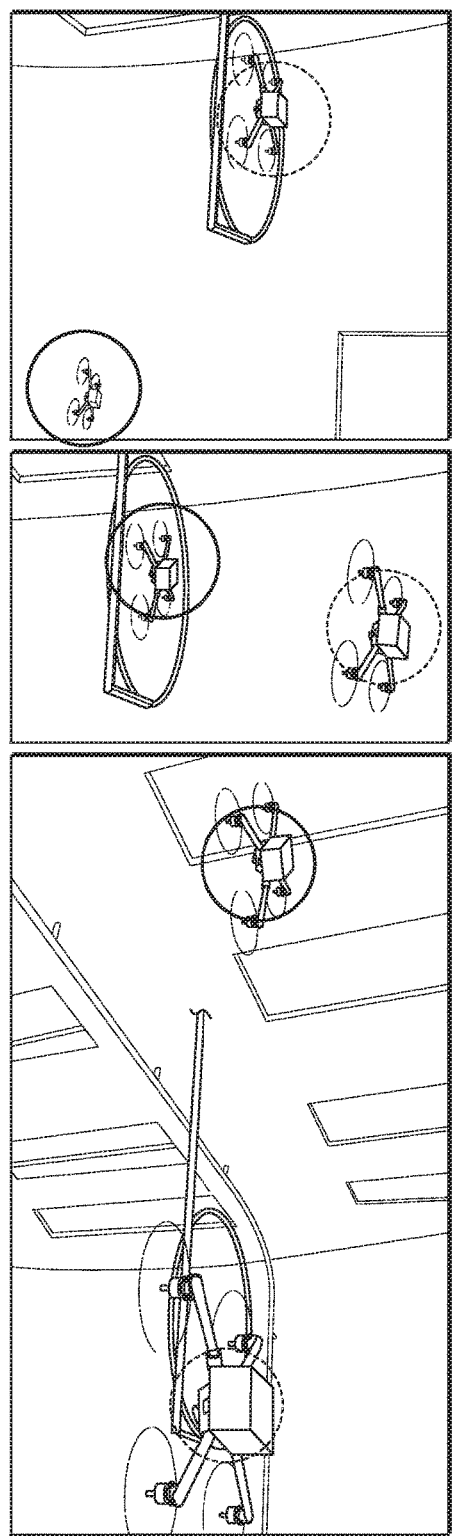
FIG. 18 illustrates snapshots of an experiment with the kQuad1000 quadrotor and the AscTec Hummingbird quadrotor in which the hoop represents the horizontal gap.
Figure 19:
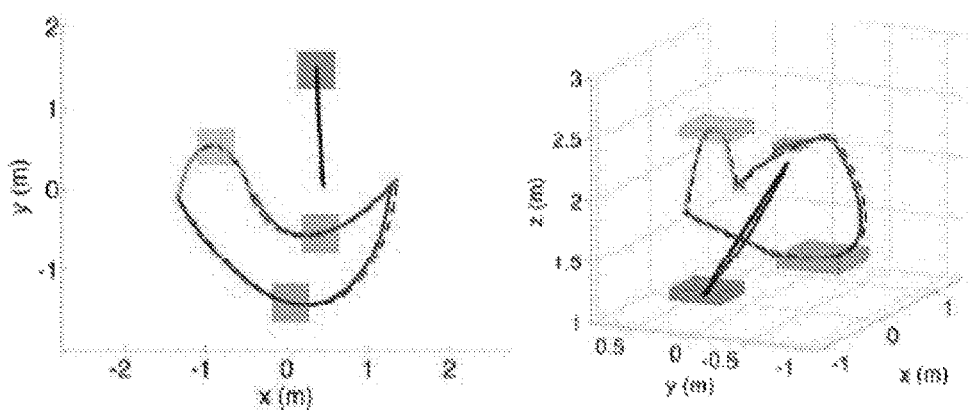
FIG. 19 illustrates trajectories for formation reconfigurations for homogeneous (a) and heterogeneous (b) quadrotor teams where the boxes represent the quadrotor positions at an intermediate time during the trajectories and the solid lines represent the actual quadrotor trajectories while the dotted lines represent the desired trajectories.
Figure 20:
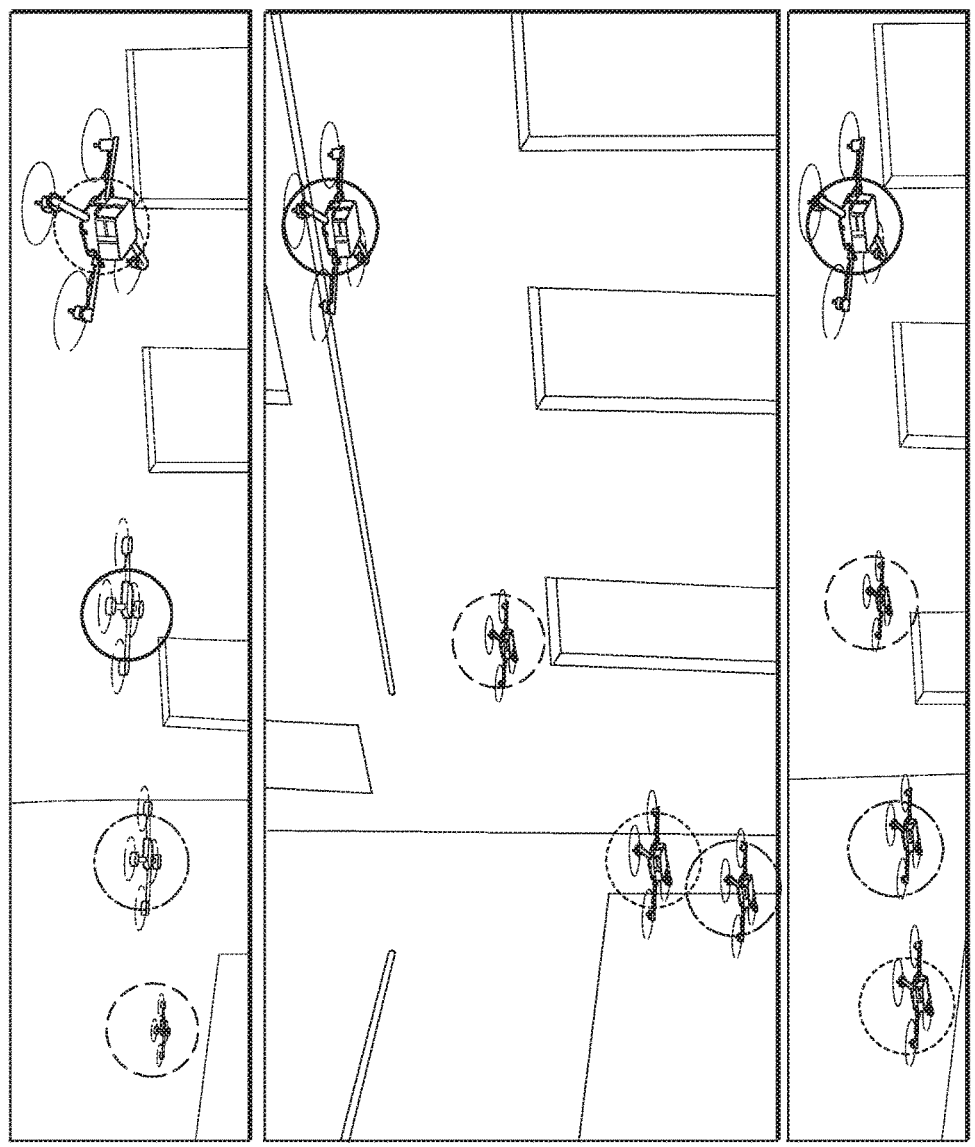
FIG. 20 illustrates snapshots of a four quadrotor transition within a line formation at the beginning (top), an intermediate time (middle), and the final time (bottom).

This experiment demonstrates planning for three vehicles in a planar scenario with obstacles. Three homogeneous Hummingbird quadrotors start on one side of a narrow gap and must pass through to goal positions on the opposite side. The trajectories were found using the method described herein using 10th order polynomials and enforcing collision constraints at 11 intermediate time steps between the two waypoints ($n_p$=10, $n_k$=11, $n_w$=1). The quadrotors were then commanded to follow these trajectories at various speeds for 30 trials with a hoop placed in the environment to represent the gap. Data and images for this experiment are shown in FIGS. 15 and 16. FIG. 15(*a*) shows the root mean-square errors (RMSE) for each of these trials. While trajectories with larger acceleration, jerk, and snap do cause larger errors (as expected), the performance degrades quite gracefully. The data for a single run is presented in FIGS. 15(*b-d*).

The experiment demonstrates the navigation of a kQuad1000 (Quadrotor 1) and a Hummingbird (Quadrotor 2) from positions below a gap to positions on the opposite side of the room above the gap. This problem is formulated as a 3-D trajectory generation problem using 13th order polynomials and enforcing collision constraints at 9 intermediate time steps between the two waypoints ($n_p$=13, $n_k$=9, $n_w$=1). For the problem formulation, four three dimensional rectangular prism shaped obstacles are used to create a single 3-D gap which the quadrotors must pass through to get to their goals. Data and images for these experiments are shown FIGS. 17 and 18. Since the bigger quadrotor has a tighter tolerance to pass through the gap, the inventors choose to weight its cost function 10 times more than the Hummingbird. This can be observed from the more indirect route taken by the quadrotor 2 in FIG. 17. Also, this can be observed by the larger error for quadrotor 2 since it is following a more difficult trajectory that requires larger velocities and accelerations. Finally, one should note that the larger quadrotor follows the smaller one up through the gap because it is allowed to fly underneath the smaller one but not vice versa.

This experiment demonstrates reconfiguration for teams of four quadrotors. This problem is formulated as a 3-D trajectory generation problem using 9th order polynomials and enforcing collision constraints at 9 intermediate time steps between the two waypoints ($n_p$=9, $n_k$=9, $n_w$=1). Trajectories are generated which transition quadrotors between arbitrary positions in a given three-dimensional formation or to a completely different formation smoothly and quickly. The inventors present several reconfigurations and a single transition within a line formation in FIGS. 19 and 20. The inventors ran the experiment with four Hummingbirds and a heterogeneous team consisting of two Hummingbirds, one kQuad65, and one kQuad1000. For the heterogeneous group, the inventors weigh the cost of the kQuad65 10 times larger than the other quads because it is the least agile and can presently only follow moderately aggressive trajectories. Note how the kQuad65 takes the most direct trajectory in 19(*b*). For the homogeneous experiment shown in FIG. 19(*a*), the quadrotors stay in the same plane because they are not allowed to fly underneath each other as described herein but in the heterogeneous experiment shown in FIG. 19(*b*), the optimal solution contains z components since larger quadrotors are allowed to fly under smaller ones.

Some problem details and their computational times for each of the MIQPs solved herein are set forth in the Table below:

| FIG. | $n_q$ | $n_p$ | $N_k$ | $n_b$ | $T_1$ (s) | $T_{opt}$ (s) |
|------|-------|-------|-------|-------|-----------|---------------|
| 14(b) | 1 | 15 | 16 | 208 | 0.42 | 35 |
| 17 | 2 | 13 | 9 | 270 | 0.62 | 1230 |
| 15 | 3 | 10 | 11 | 300 | 0.21 | 553 |
| 19(a) | 4 | 9 | 9 | 324 | 0.11 | 39 |
| 19(b) | 4 | 9 | 9 | 324 | 0.45 | 540 |

All computation times are listed for a MacBook Pro laptop with a 2.66 GHz Intel Core 2 Duo processor using the CPLEX MIQP solver. Note that while certain problems take a long time to find the optimal solution and prove optimality, a first solution is always found is less than a second. The solver can be stopped any time after the first feasible answer is found and return a sub-optimal solution.

Those skilled in the art also will readily appreciate that many additional modifications and scenarios are possible in the exemplary embodiment without materially departing from the novel teachings and advantages of the invention. Accordingly, any such modifications are intended to be included within the scope of this invention as defined by the following exemplary claims.

What is claimed:

1. A trajectory generation method for controlling states of at least two vehicles towards goal positions and orientations, the method comprising the steps of:

determining orientation and angular velocities of the vehicles;

controlling the orientation and angular velocities of the vehicles by controlling at least one motor of the vehicles;

determining current position and velocity of each of the vehicles;

controlling the position and velocity of each of the vehicles by specifying the desired orientation and angular velocities and the net thrust required from the at least one motor;

calculating for each of the vehicles, at predetermined intervals of time, optimum trajectory paths by using piece-wise smooth polynomial functions, applying relative cost weighting factors among the at least two vehicles and enforcing inter-vehicle overlap constraints;

based on the calculated optimum trajectory paths, sending commands to each of the vehicles to control, individually, their state, causing such vehicles to follow the calculated optimum trajectory path while avoiding collisions; and updating current position and velocity of each of the vehicles.

2. A method as in claim 1, wherein each state of a vehicle comprises its orientation and angular velocity, and position and linear velocity.

3. A method as in claim 1, wherein an orientation error is estimated and the orientation is controlled on-board of each of the vehicles.

4. A method as in claim 1, wherein the weighting factors applied to each of the at least two vehicles are dissimilar.

5. A method as in claim 1, wherein the method is iteratively executed at a plurality of said pre-determined intervals of time.

6. A method as in claim 1, further comprising using integer constraints to enforce collision constraints with obstacles and other vehicles and to optimally assign goal positions for said at least two vehicles.

7. A method as in claim 6, wherein said integer constraints are used to find the optimal goal assignments for the flying vehicles by applying for each quadrotor q and goal g the following integer constraints:

$$x_{T_q}(t_{nw}) \leq x_g + M\beta_{qg}$$
$$x_{T_q}(t_{nw}) \geq x_g - M\beta_{qg}$$
$$y_{T_q}(t_{nw}) \leq y_g + M\beta_{qg}$$
$$y_{T_q}(t_{nw}) \geq y_g - M\beta_{qg}$$
$$z_{T_q}(t_{nw}) \leq z_g + M\beta_{qg}$$
$$z_{T_q}(t_{nw}) \geq z_g - M\beta_{qg}$$

where $\beta_{qg}$ is a binary variable used to enforce an optimal goal assignment.

8. A method as in claim 7, further comprising applying the following constraint to guarantee that at least $n_g$ quadrotors reach the desired goal positions:

$$\Sigma_{q=1}^{n_q}\Sigma_{g=1}^{n_g}\beta_{qg} \leq n_g n_q - n_g.$$

9. A method as in claim 1, wherein the at least two vehicles comprises at least two flying vehicles.

10. A trajectory generation method for controlling states of at least two flying vehicles towards goal positions and orientations, the method comprising the steps of:
  determining orientation and angular velocities of the flying vehicles;
  controlling the orientation and angular velocities of the flying vehicles by controlling at least one motor of the flying vehicles;
  determining current position and velocity of each of the flying vehicles;
  controlling the position and velocity of each of the flying vehicles by specifying the desired orientation and angular velocities and the net thrust required from the at least one motor;
  calculating for each of the flying vehicles, at predetermined intervals of time, optimum trajectory paths by using piece-wise smooth polynomial functions, applying weighting factors and enforcing overlap constraints;
  based on the calculated optimum trajectory paths, sending commands to each of the flying vehicles to control, individually, their state, causing such flying vehicles to follow the calculated optimum trajectory path while avoiding collisions; and
updating current position and velocity of each of the flying vehicles,
wherein calculating an optimum trajectory path for each flying vehicle comprises generating trajectories that smoothly transition through $n_w$ desired waypoints at specified times, $t_w$, while minimizing the integral of the $k_r$th derivative of position squared for $n_q$ quadrotors in accordance with the equation:

$$\min \sum_{q=1}^{n_q} \int_{t_0}^{t_{n_w}} \left\| \frac{d^{k_r} r_{T_q}}{dt^{k_r}} \right\|^2 dt$$

s.t. $r_{T_q}(t_w) = r_{wq}, w = 0, \ldots, n_w; \forall q$ $$\left. \frac{d^j x_{T_q}}{dt^j} \right| t = t_w = 0 \text{ or free}, w = 0, n_w; j = 1, \ldots, k_r; \forall q$$

$$\left. \frac{d^j y_{T_q}}{dt^j} \right| t = t_w = 0 \text{ or free}, w = 0, n_w; j = 1, \ldots, k_r; \forall q$$

$$\left. \frac{d^j z_{T_q}}{dt^j} \right| t = t_w = 0 \text{ or free}, w = 0, n_w; j = 1, \ldots, k_r; \forall q$$

where $rT_q = [xT_q, yT_q, zT_q]$ represents the trajectory for quadrotor q and $r_{wq}$ represents desired waypoints for quadrotor q.

11. A method as in claim 10, wherein the flying vehicles are maintained at a safe distance from each other when transitioning between waypoints on a flying vehicle's trajectory path by enforcing a constraint at $n_k$ intermediate time steps between waypoints which can be represented mathematically for flying vehicles 1 and 2 by the following set of constraints:

$$\forall t_k: x_{T1}(t_k) - x_{T2}(t_k) \leq d_{x12}$$

or $x_{T2}(t_k) - x_{T1}(t_k) \leq d_{x21}$ or $y_{T1}(t_k) - y_{T2}(t_k) \leq d_{y12}$ or $y_{T2}(t_k) - y_{T1}(t_k) \leq d_{y21}$ where the d terms represent safety distances between flying vehicles 1 and 2.

12. A method as in claim 11, wherein said flying vehicles are axially symmetric and $d_{x12} = d_{x21} = d_{y12} = d_{y21}$.

13. A trajectory generation method for controlling states of at least two flying vehicles towards goal positions and orientations, the method comprising the steps of:
  determining orientation and angular velocities of the flying vehicles;
  controlling the orientation and angular velocities of the flying vehicles by controlling at least one motor of the flying vehicles;
  determining current position and velocity of each of the flying vehicles;
  controlling the position and velocity of each of the flying vehicles by specifying the desired orientation and angular velocities and the net thrust required from the at least one motor;
  calculating for each of the flying vehicles, at predetermined intervals of time, optimum trajectory paths by using piece-wise smooth polynomial functions, applying weighting factors and enforcing overlap constraints;
  based on the calculated optimum trajectory paths, sending commands to each of the flying vehicles to control, individually, their state, causing such flying vehicles to follow the calculated optimum trajectory path while avoiding collisions; and updating current position and velocity of each of the flying vehicles,
further comprising providing collision avoidance among said at least two flying vehicles by modeling the flying vehicles as a rectangular prism oriented with a world frame with side lengths $l_x$, $l_y$, and $l_z$ that are large enough so that the flying machines may roll, pitch, and yaw to any angle and stay within the prism.

14. A method as in claim 13, further comprising navigating the prism through an environment with $n_o$ convex obstacles, where each convex obstacle o is represented by a convex region in configuration space with n(o) faces, and for each face f the condition that the flying vehicle's desired position at time $t_k$, $rT_q(t_k)$, is outside of obstacle o is represented as:

$$n_{of} \cdot r_{T_q}(t_k) \leq s_{of}$$

where $n_{of}$ is the normal vector to face f of obstacle o in configuration space and $s_{of}$ is a scalar, whereby if the equation for the flying vehicle's positions at time $t_k$ is satisfied for at least one of the faces, then the rectangular prism, and hence the flying machine, is not in collision with the obstacle.

15. A method as in claim 14, wherein a condition that flying machine q does not collide with an obstacle o at time $t_k$ is enforced with binary variables, $b_{qofk}$, as:

$$n_{of} \cdot r_{T_q}(t_k) \leq s_{of} + Mb_{qofk} \ \forall \ f = 1, \ldots, n_f(o)$$

$$b_{qofk} = 0 \text{ or } 1 \ \forall \ f = 1, \ldots, n_f(o)$$

$$\sum_{f=1}^{n_f(o)} b_{qofk} = n_f(o) - 1$$

where M is a large positive number.

16. A method as in claim 15, wherein the equation of claim 15 is introduced into the equation of claim 10 for all $n_q$ flying machines for all obstacles at $n_k$ intermediate time steps between waypoints.

17. A trajectory generation method for controlling states of at least two flying vehicles towards goal positions and orientations, the method comprising the steps of:
  determining orientation and angular velocities of the flying vehicles;
  controlling the orientation and angular velocities of the flying vehicles by controlling at least one motor of the flying vehicles;
  determining current position and velocity of each of the flying vehicles;
  controlling the position and velocity of each of the flying vehicles by specifying the desired orientation and angular velocities and the net thrust required from the at least one motor;
  calculating for each of the flying vehicles, at predetermined intervals of time, optimum trajectory paths by using piece-wise smooth polynomial functions, applying weighting factors and enforcing overlap constraints;
  based on the calculated optimum trajectory paths, sending commands to each of the flying vehicles to control, individually, their state, causing such flying vehicles to follow the calculated optimum trajectory path while avoiding collisions; and
updating current position and velocity of each of the flying vehicles,
the method further comprising:
  organizing the flying vehicles into a plurality of groups, wherein each of the plurality of groups are coordinated independently; and
  generating a trajectory for each of the plurality of groups to group goal positions.

18. A method as in claim 17, wherein an environment for the flying vehicles is partitioned into nr convex sub-regions where each sub-region contains the same number of flying vehicle start and goal positions, and separate trajectories are generated for the flying vehicles inside each sub-region whereby the flying vehicles are required to stay inside their own sub-regions using linear constraints on the positions of the flying vehicles.

19. A system for controlling trajectories of at least two vehicles towards goal positions, the system comprising:
  at least two vehicles with onboard inertial measurement units for determining and updating orientation, angular velocities, position and linear velocities of the at least two vehicles;
  a motion capture system to detect current position and velocity of each of the at least two vehicles;
  a base controller in communication with the motion capture system and in communication with the plurality of vehicles, said base controller calculating, for each of the vehicles, at predetermined intervals of time, optimum trajectory paths using piece-wise smooth polynomial functions, applying relative cost weighting factors among the plurality of vehicles, and enforcing inter-vehicle overlap constraints, and based on the calculated optimum trajectory path, sending commands to each of the vehicles to control, individually, their state, causing said at least two vehicles to follow the calculated optimum trajectory path while avoiding collisions.

20. A system as in claim 19, wherein the at least two vehicles are homogenous vehicles.

21. A system as in claim 19, wherein the at least two vehicles are heterogeneous vehicles.

22. A system as in claim 19, wherein each state of a vehicle comprises its orientation and angular velocity, and position and linear velocity.

23. A system as in claim 19, further comprising a microcontroller on board each of the vehicles that estimates an orientation error and controls the orientation of the associated vehicle.

24. A system as in claim 21, wherein the weighting factors applied to each of the at least two vehicles are dissimilar.

25. A system as in claim 19, wherein said base controller uses integer constraints to enforce collision constraints with obstacles and other vehicles and to optimally assign goal positions for said at least two vehicles.

26. A system as in claim 25, wherein the base station uses said integer constraints to find the optimal goal assignments for the flying vehicles by applying for each quadrotor q and goal g the following integer constraints:

$$x_{T_q}(t_{nw}) \leq x_g + M\beta_{qg}$$

$$x_{T_q}(t_{nw}) \geq x_g - M\beta_{qg}$$

$$y_{T_q}(t_{nw}) \leq y_g + M\beta_{qg}$$

$$y_{T_q}(t_{nw}) \geq y_g - M\beta_{qg}$$

$$z_{T_q}(t_{nw}) \leq z_g + M\beta_{qg}$$

$$z_{T_q}(t_{nw}) \geq z_g - M\beta_{qg}$$

where $\beta_{qg}$ is a binary variable used to enforce an optimal goal assignment.

27. A system as in claim 26, wherein said base controller further applies the following constraint to guarantee that at least $n_g$ quadrotors reach the desired goal positions:

$$\Sigma_{q=1}^{n_q}\Sigma_{g=1}^{n_g}\beta_{qg} \leq n_g n_q - n_g.$$

28. A system as in claim 19, wherein the at least two vehicles comprises at least two flying vehicles.

29. A system for controlling flight trajectories of at least two flying vehicles towards goal positions, the system comprising:
   at least two flying vehicles with onboard inertial measurement units for determining and updating orientation, angular velocities, position and linear velocities of the at least two flying vehicles;
   a motion capture system to detect current position and velocity of each of the at least two flying vehicles;
   a base controller in communication with the motion capture system and in communication with the plurality of flying vehicles, said base controller calculating, for each of the flying vehicles, at predetermined intervals of time, optimum trajectory paths using piece-wise smooth polynomial functions, applying weighting factors, and enforcing overlap constraints, and based on the calculated optimum trajectory path, sending commands to each of the flying vehicles to control, individually, their state, causing said at least two flying vehicles to follow the calculated optimum trajectory path while avoiding collisions,
wherein said base controller calculates an optimum trajectory path for each flying vehicle by generating trajectories that smoothly transition through $n_w$ desired waypoints at specified times, $t_w$, while minimizing the integral of the $k_r$th derivative of position squared for $n_q$ quadrotors in accordance with the equation:

$$\min \sum_{q=1}^{n_q} \int_{t_0}^{t_{n_w}} \left\| \frac{d^{k_r} r_{T_q}}{dt^{k_r}} \right\|^2 dt$$

s.t. $r_{T_q}(t_w) = r_{wq}, w = 0, \ldots, n_w; \forall q$ $\left. \dfrac{d^j x_{T_q}}{dt^j} \right| t = t_w = 0$ or free, $w = 0, n_w; j = 1, \ldots, k_r; \forall q$ $\left. \dfrac{d^j y_{T_q}}{dt^j} \right| t = t_w = 0$ or free, $w = 0, n_w; j = 1, \ldots, k_r; \forall q$ $\left. \dfrac{d^j z_{T_q}}{dt^j} \right| t = t_w = 0$ or free, $w = 0, n_w; j = 1, \ldots, k_r; \forall q$ where $rT_q = [xT_q, yT_q, zT_q]$ represents the trajectory for quadrotor q and $r_{wq}$ represents desired waypoints for quadrotor q.

30. A system as in claim 29, wherein the base station maintains flying vehicles at a safe distance from each other when transitioning between waypoints on a flying vehicle's trajectory path by enforcing a constraint at $n_k$ intermediate time steps between waypoints which can be represented mathematically for flying vehicles 1 and 2 by the following set of constraints:

$\forall t_k: x_{T1}(t_k) - x_{T2}(t_k) \leq d_{x12}$ or $x_{T2}(t_k) - x_{T1}(t_k) \leq d_{x21}$ or $y_{T1}(t_k) - y_{T2}(t_k) \leq d_{y12}$ or $y_{T2}(t_k) - y_{T1}(t_k) \leq d_{y21}$ where the d terms represent safety distances between flying vehicles 1 and 2.

31. A system as in claim 30, wherein said flying vehicles are axially symmetric and $d_{x12} = d_{x21} = d_{y12} = d_{y21}$.

32. A system for controlling flight trajectories of at least two flying vehicles towards goal positions, the system comprising:
   at least two flying vehicles with onboard inertial measurement units for determining and updating orientation, angular velocities, position and linear velocities of the at least two flying vehicles;
   a motion capture system to detect current position and velocity of each of the at least two flying vehicles;
   a base controller in communication with the motion capture system and in communication with the plurality of flying vehicles, said base controller calculating, for each of the flying vehicles, at predetermined intervals of time, optimum trajectory paths using piece-wise smooth polynomial functions, applying weighting factors, and enforcing overlap constraints, and based on the calculated optimum trajectory path, sending commands to each of the flying vehicles to control, individually, their state, causing said at least two flying vehicles to follow the calculated optimum trajectory path while avoiding collisions,
wherein said base controller further provides collision avoidance among said at least two flying vehicles by modeling the flying vehicles as a rectangular prism oriented with a world frame with side lengths $l_x$, $l_y$, and $l_z$ that are large enough so that the flying machines may roll, pitch, and yaw to any angle and stay within the prism.

33. A system as in claim 32, wherein said base controller navigates the prism through an environment with $n_o$ convex obstacles, where each convex obstacle o is represented by a convex region in configuration space with $n(o)$ faces, and for each face f the condition that the flying vehicle's desired position at time $t_k$, $rT_q(t_k)$, is outside of obstacle o is represented as:

$n_{of} rT_q(t_k) \leq s_{of}$ where $n_{of}$ is the normal vector to face f of obstacle o in configuration space and $s_{of}$ is a scalar, whereby if the equation for the flying vehicle's positions at time $t_k$ is satisfied for at least one of the faces, then the rectangular prism, and hence the flying machine is not in collision with the obstacle.

34. A system as in claim 33, wherein the base controller enforces a condition that flying machine q does not collide with an obstacle o at time $t_k$ with binary variables, $b_{qofk}$, as:

$n_{of} \cdot r_{T_q}(t_k) \leq s_{of} + M b_{qofk} \ \forall f = 1, \cdots, n_f(o)$ $b_{qofk} = 0$ or $1 \ \forall f = 1, \ldots, n_f(o)$ $\sum_{f=1}^{n_f(o)} b_{qofk} = n_f(o) - 1$ where M is a large positive number.

35. A system as in claim 34, wherein the base controller introduces the equation of claim 34 into the equation of claim 29 for all $n_q$ flying machines for all obstacles at $n_k$ intermediate time steps between waypoints.

36. A system for controlling flight trajectories of at least two flying vehicles towards goal positions, the system comprising:
- at least two flying vehicles with onboard inertial measurement units for determining and updating orientation, angular velocities, position and linear velocities of the at least two flying vehicles;
- a motion capture system to detect current position and velocity of each of the at least two flying vehicles;
- a base controller in communication with the motion capture system and in communication with the plurality of flying vehicles, said base controller calculating, for each of the flying vehicles, at predetermined intervals of time, optimum trajectory paths using piece-wise smooth polynomial functions, applying weighting factors, and enforcing overlap constraints, and based on the calculated optimum trajectory path, sending commands to each of the flying vehicles to control, individually, their state, causing said at least two flying vehicles to follow the calculated optimum trajectory path while avoiding collisions, wherein said base controller is further programmed to: organize the flying vehicles into a plurality of groups, wherein each of the plurality of groups are coordinated independently; and generate a trajectory for each of the plurality of groups to group goal positions.

37. A system as in claim 36, wherein the base controller partitions an environment for the flying vehicles into nr convex sub-regions where each sub-region contains the same number of flying vehicle start and goal positions, and generates separate trajectories for the vehicles inside each sub-region whereby the flying vehicles are required to stay inside their own sub-regions using linear constraints on the positions of the flying vehicles.

* * * * *